(12) United States Patent
Kobashiri

(10) Patent No.: US 11,330,177 B2
(45) Date of Patent: May 10, 2022

(54) IMAGE PROCESSING APPARATUS AND IMAGE PROCESSING METHOD

(71) Applicant: SONY SEMICONDUCTOR SOLUTIONS CORPORATION, Kanagawa (JP)

(72) Inventor: Takanobu Kobashiri, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/961,165

(22) PCT Filed: Jan. 10, 2019

(86) PCT No.: PCT/JP2019/000563
§ 371 (c)(1),
(2) Date: Jul. 9, 2020

(87) PCT Pub. No.: WO2019/146419
PCT Pub. Date: Aug. 1, 2019

(65) Prior Publication Data
US 2020/0366843 A1  Nov. 19, 2020

(30) Foreign Application Priority Data
Jan. 25, 2018 (JP) .............................. JP2018-010643

(51) Int. Cl.
*G06F 3/0484* (2013.01)
*H04N 5/232* (2006.01)
(Continued)

(52) U.S. Cl.
CPC ..... *H04N 5/23245* (2013.01); *G06F 3/04842* (2013.01); *G06F 3/04845* (2013.01); *G06T 11/001* (2013.01); *H04N 5/232933* (2018.08)

(58) Field of Classification Search
CPC .......... H04N 5/23245; H04N 5/232933; G06F 3/04845; G06F 3/04842; G06T 11/001
See application file for complete search history.

(56) References Cited

U.S. PATENT DOCUMENTS

2012/0218439 A1    8/2012  Ueda et al.
2012/0294522 A1*  11/2012  Ueda ......................... G06T 7/90
                                                                  382/165
(Continued)

FOREIGN PATENT DOCUMENTS

CN    102651818 A     8/2012
CN    102790886 A    11/2012
(Continued)

OTHER PUBLICATIONS

International Search Report and Written Opinion of PCT Application No. PCT/JP2019/000563, dated Mar. 26, 2019, 12 pages of ISRWO.

*Primary Examiner* — Anil K Bhargava
(74) *Attorney, Agent, or Firm* — Chip Law Group

(57) ABSTRACT

An apparatus and a method for generating a high-quality one point color image are provided. A composite image generation unit that generates a composite image by executing composition processing using a color image and a monochrome image captured from different viewpoints, and an output image generation unit that generates a one point color image in which only a partial area of the image is colored are included. The output image generation unit generates a one point color image in which a colorization area in the one point color image is set as an area to which pixel values of the composite image are output, and a non-colorization area is set as an area to which pixel values of the monochrome image are output. The colorization area is selected by either user selection or automatic selection. For example, user- (Continued)

specified area information, subject distance information, and the like are used for the execution.

14 Claims, 16 Drawing Sheets

(51) Int. Cl.
    *G06F 3/04842*     (2022.01)
    *G06F 3/04845*     (2022.01)
    *G06T 11/00*     (2006.01)

(56) References Cited

U.S. PATENT DOCUMENTS

| | | |
|---|---|---|
| 2013/0229544 A1 | 9/2013 | Bando |
| 2013/0257896 A1* | 10/2013 | Nishiyama ............ G06T 11/001 |
| | | 345/593 |
| 2014/0285682 A1 | 9/2014 | Takayama et al. |
| 2015/0103201 A1 | 4/2015 | Ueda et al. |
| 2015/0278996 A1* | 10/2015 | Tsutsumi ............ H04N 13/243 |
| | | 348/47 |
| 2017/0147897 A1 | 5/2017 | Ueda et al. |

FOREIGN PATENT DOCUMENTS

| | | |
|---|---|---|
| EP | 2493200 A1 | 8/2012 |
| EP | 2525562 A2 | 11/2012 |
| JP | 2012-178788 A | 9/2012 |
| JP | 2012-244337 A | 12/2012 |
| JP | 2013-183353 A | 9/2013 |
| JP | 2013-228689 A | 11/2013 |
| JP | 2014-207659 A | 10/2014 |
| JP | 2015-197745 A | 11/2015 |
| TW | 201312991 A | 3/2013 |

* cited by examiner

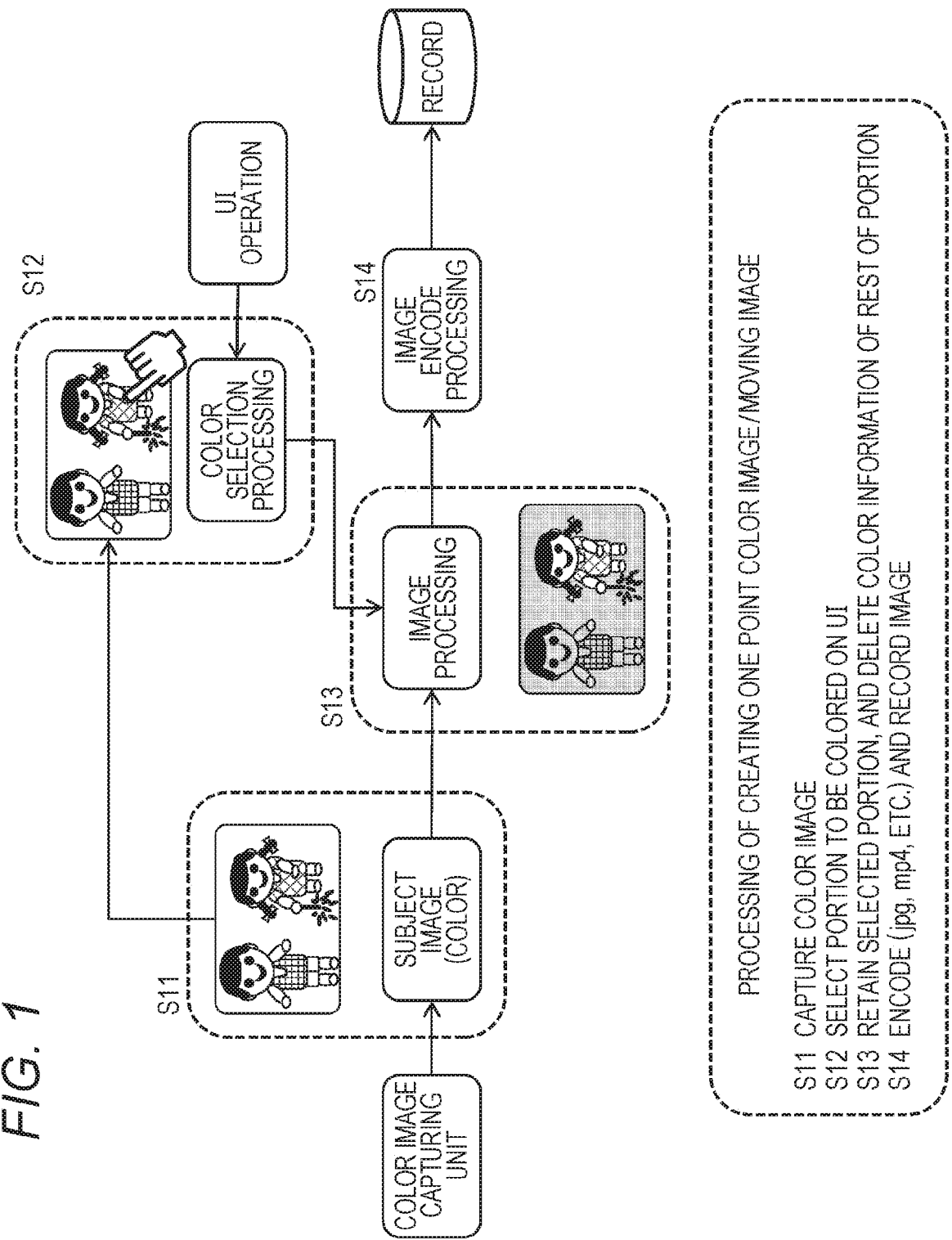

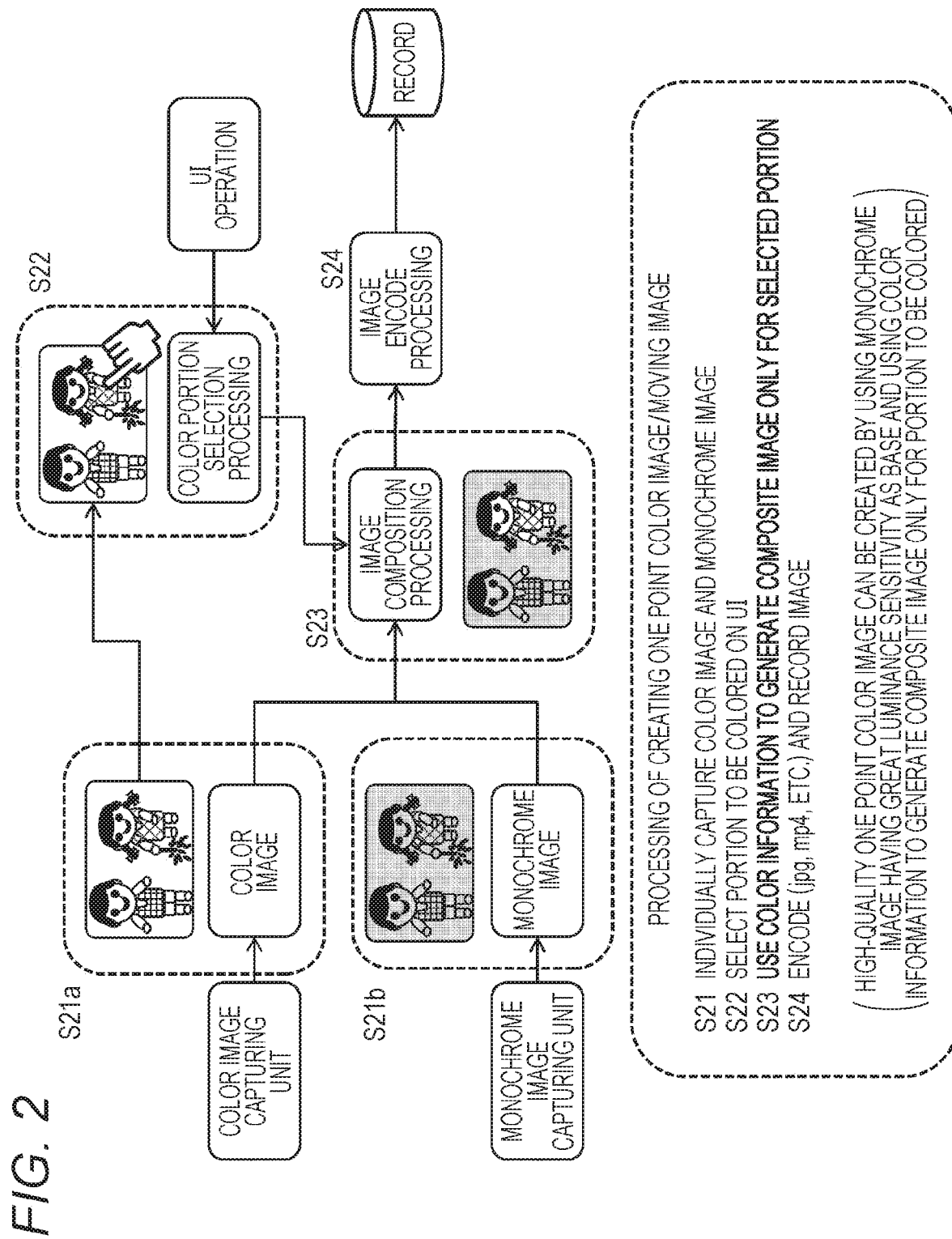

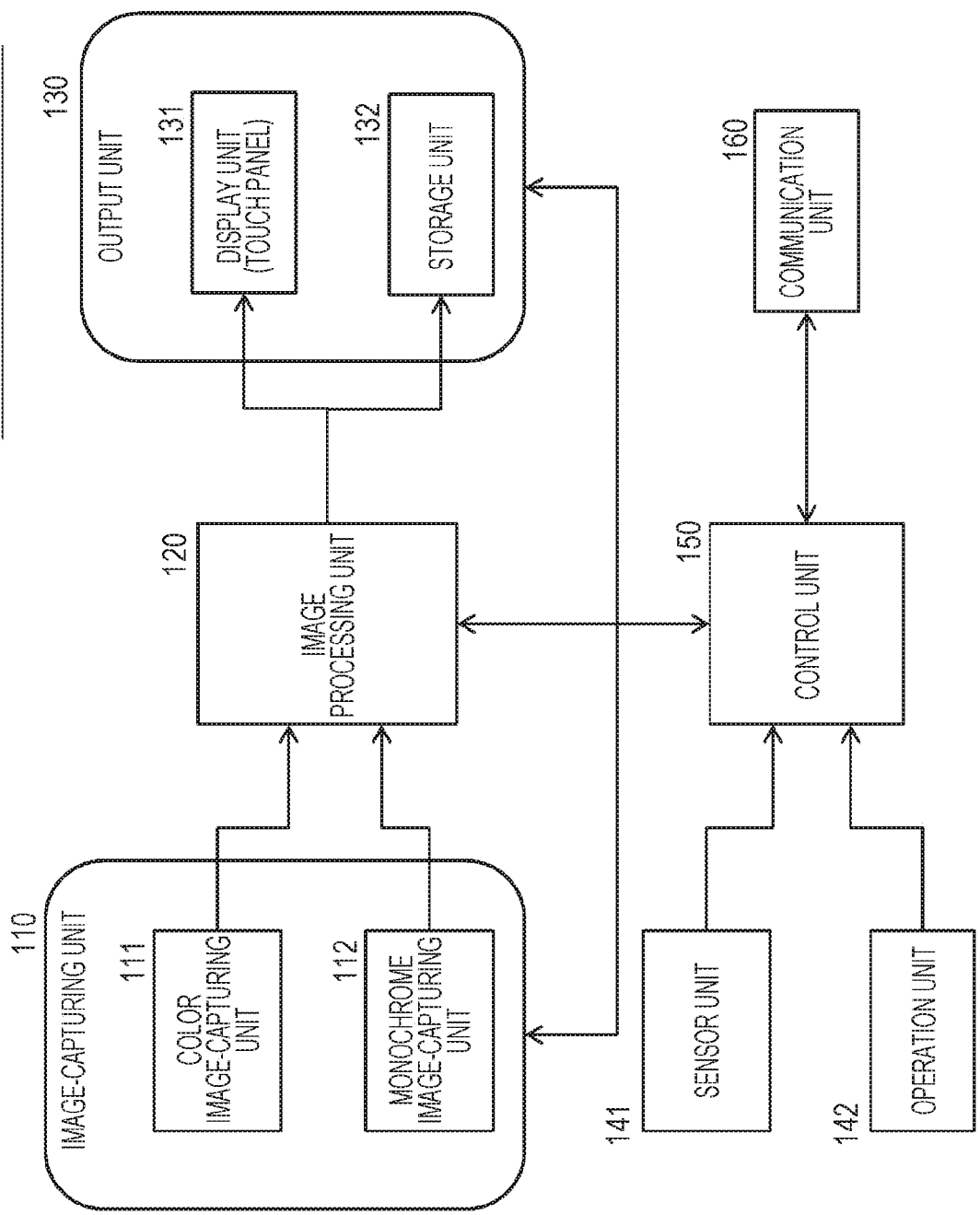

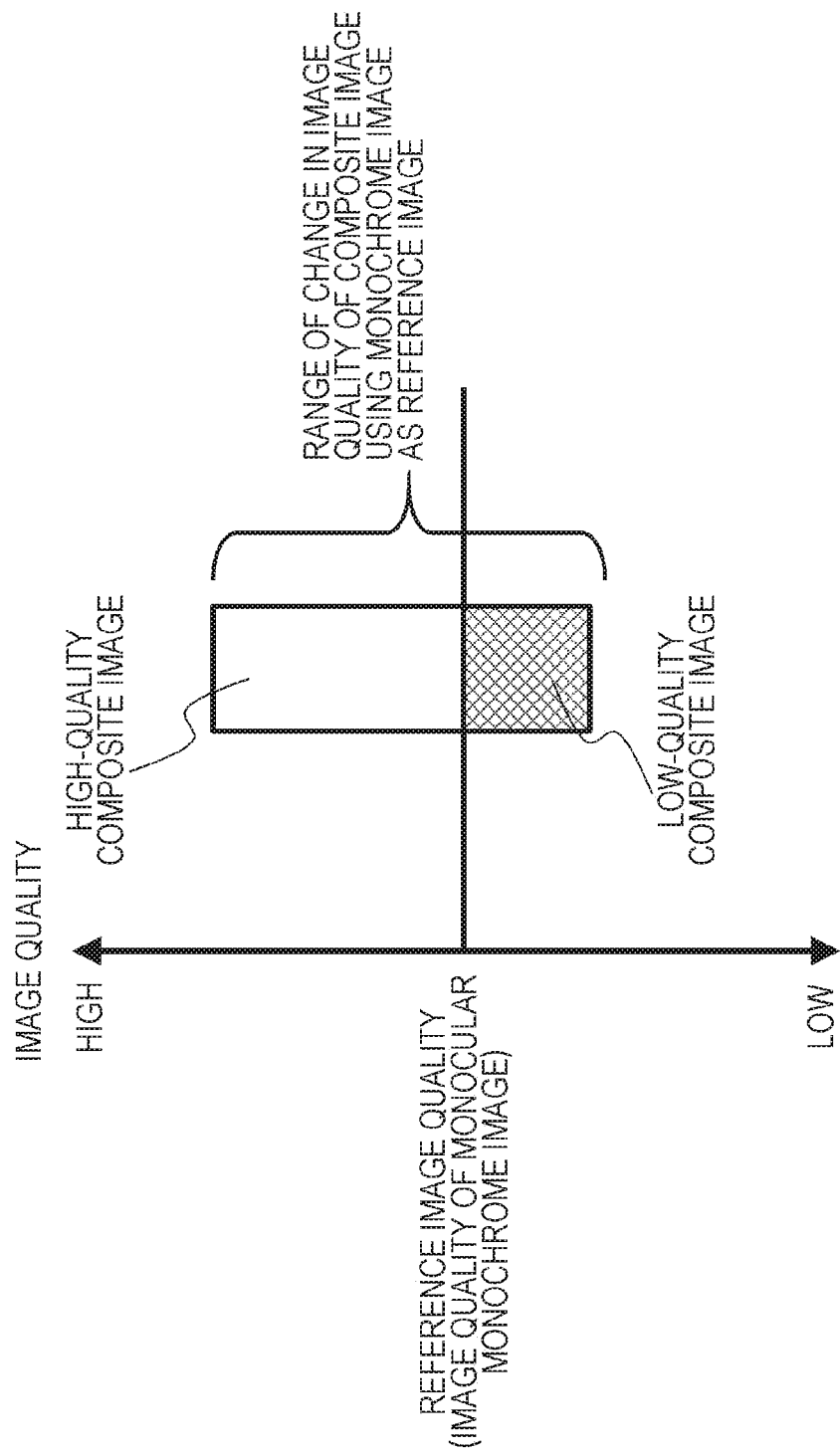

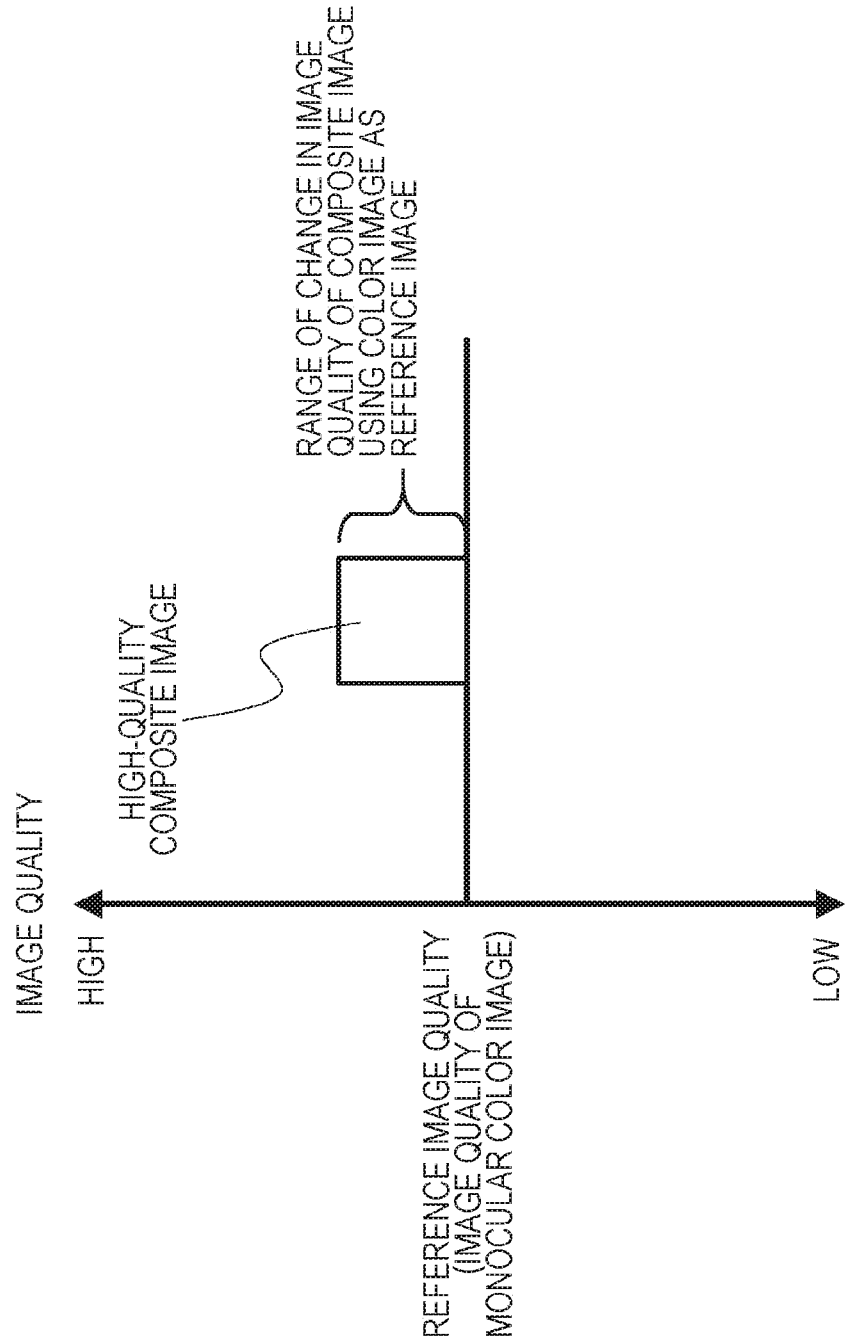

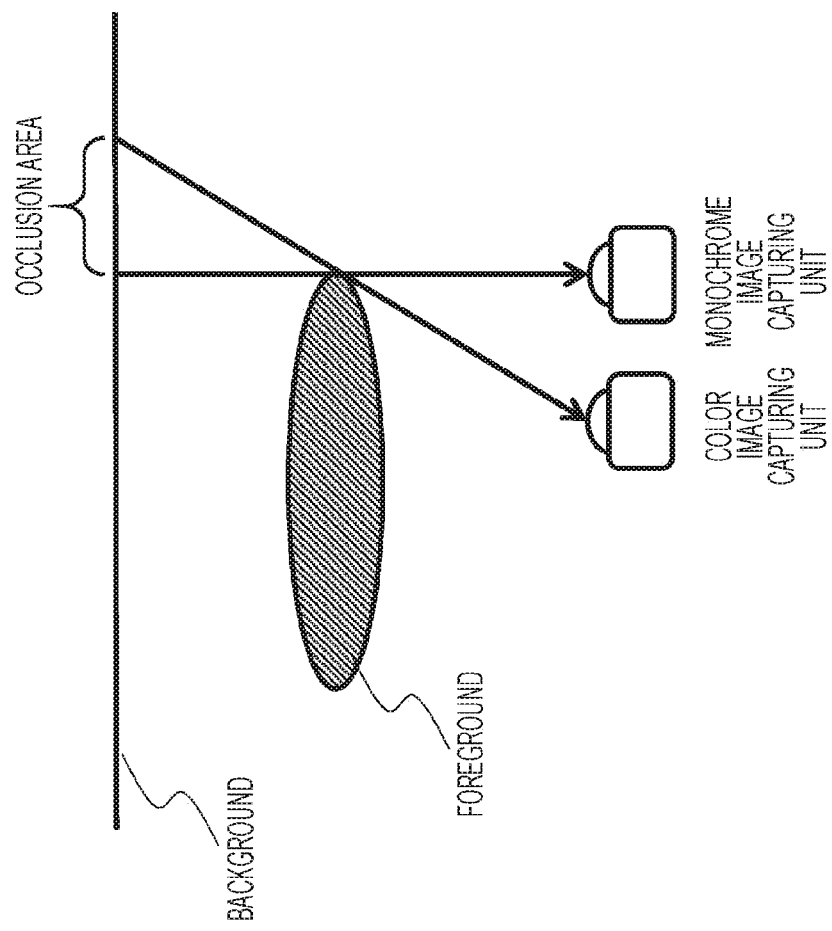

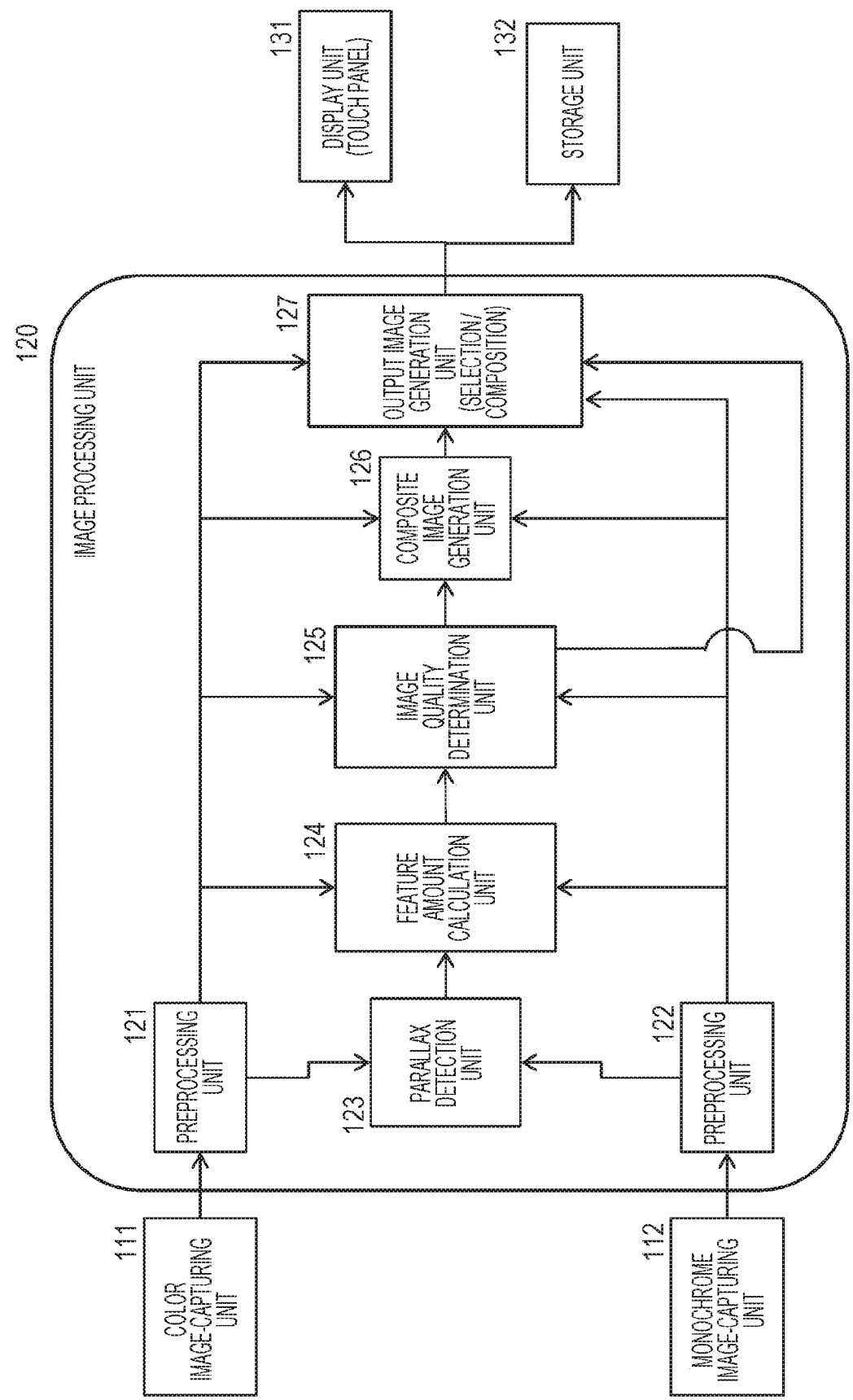

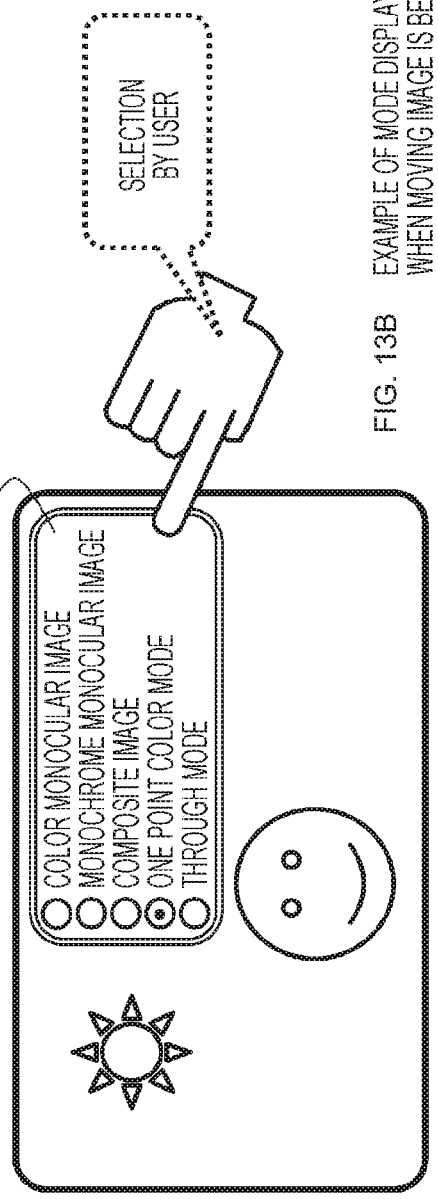
FIG. 13A  EXAMPLE OF MENU-DRIVEN SWITCHING UI
251 MODE SELECTION UI
SELECTION BY USER
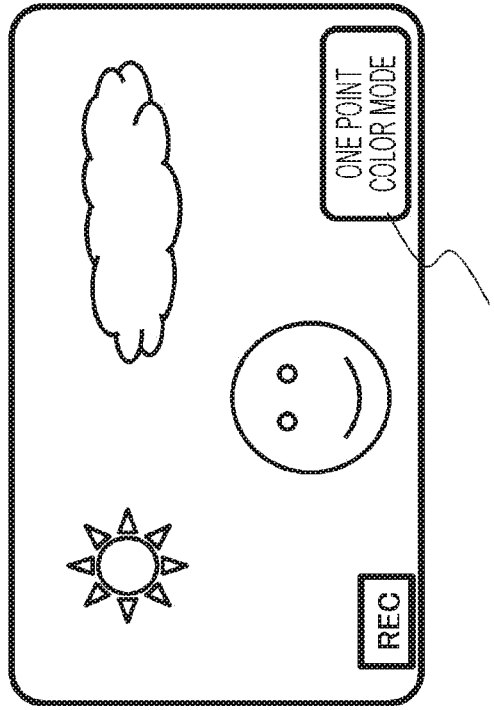
FIG. 13B  EXAMPLE OF MODE DISPLAY/SWITCHING UI WHEN MOVING IMAGE IS BEING RECORDED
252 EXECUTION MODE DISPLAY UNIT

IMAGE PROCESSING APPARATUS AND IMAGE PROCESSING METHOD

CROSS REFERENCE TO RELATED APPLICATIONS

This application is a U.S. National Phase of International Patent Application No. PCT/JP2019/000563 filed on Jan. 10, 2019, which claims priority benefit of Japanese Patent Application No. JP 2018-010643 filed in the Japan Patent Office on Jan. 25, 2018. Each of the above-referenced applications is hereby incorporated herein by reference in its entirety.

TECHNICAL FIELD

The present disclosure relates to an image processing apparatus and an image processing method, and a program. More specifically, the present disclosure relates to an image processing apparatus and an image processing method, and a program for generating a one point color image in which only a part of an image area is colored by performing composition processing using a color image and a monochrome image captured by a plurality of image-capturing units.

BACKGROUND ART

An image in which only a partial area of the image is colored and the remaining area is monochrome is called a one point color image.

For example, Patent Document 1 (Japanese Patent Application Laid-Open No. 2013-228689) describes a conventional technology for generating such a one point color image.

Patent Document 1 discloses a configuration in which a user specifies an area in a color image, only the specified area is retained as a color image, the remaining area is converted to a monochrome image, and thus a one point color image is generated.

CITATION LIST

Patent Document

Patent Document 1: Japanese Patent Application Laid-Open No. 2013-228689

SUMMARY OF THE INVENTION

Problems to be Solved by the Invention

Patent Document 1 described above discloses a configuration for generating a one point color image using only a color image.

In contrast, in a configuration of the present disclosure, a one point color image is generated using two images, a color image and a monochrome image.

As compared to a color image, a monochrome image can faithfully reproduce luminance information, and a composite color image obtained by composition using a color image and luminance information of a monochrome image has a higher image quality.

Thus, for example, by generating a composite image (color image) using a color image and a monochrome image only for an area to be colored, and generating a monochrome image using a monochrome image for the remaining area, a high-quality one point color image in which high-precision luminance information of the monochrome image is reflected on the entire image can be generated.

The present disclosure is aimed at providing an image processing apparatus and an image processing method, and a program that can generate a high-quality one point color image using two images, a color image and a monochrome image, as described above.

Solutions to Problems

A first aspect of the present disclosure provides
an image processing apparatus including:
a composite image generation unit that generates a composite image by executing composition processing using a color image and a monochrome image captured from different viewpoints; and
an output image generation unit that generates a one point color image in which only a partial area of the image is colored,
in which the output image generation unit generates a one point color image in which
a colorization area in the one point color image is set as an area to which pixel values of the composite image are output, and
a non-colorization area in the one point color image is set as an area to which pixel values of the monochrome image are output.

Moreover, a second aspect of the present disclosure provides
an image processing method executed by an image processing apparatus, the method including:
a composite image generation step in which a composite image generation unit generates a composite image by executing composition processing using a color image and a monochrome image captured from different viewpoints; and
an output image generation step in which an output image generation unit generates a one point color image in which only a partial area of the image is colored,
in which the output image generation step generates a one point color image in which
a colorization area in the one point color image is set as an area to which pixel values of the composite image are output, and
a non-colorization area in the one point color image is set as an area to which pixel values of the monochrome image are output.

Moreover, a third aspect of the present disclosure provides
a program that causes an image processing apparatus to execute image processing including:
a composite image generation step that causes a composite image generation unit to generate a composite image by executing composition processing using a color image and a monochrome image captured from different viewpoints; and
an output image generation step that causes an output image generation unit to generate a one point color image in which only a partial area of the image is colored,
in which the output image generation step causes generation of a one point color image in which
a colorization area in the one point color image is set as an area to which pixel values of the composite image are output, and
a non-colorization area in the one point color image is set as an area to which pixel values of the monochrome image are output.

Note that the program of the present disclosure is, for example, a program that can be provided, by a storage medium or a communication medium provided in a computer-readable format, to an information processing device or a computer system that can execute various program codes. By providing such a program in a computer-readable format, processing according to the program is performed on the information processing device or the computer system.

Other objects, features, and advantages of the present disclosure will become apparent from the detailed description based on the embodiment of the present disclosure and the accompanying drawings described later. Note that, in the present specification, a system is a logical assembly constituted by a plurality of devices, and the devices constituting the assembly are not necessarily contained in the same housing.

Effects of the Invention

According to a configuration of an embodiment of the present disclosure, according to a configuration of an embodiment of the present disclosure, an apparatus and a method capable of generating a high-quality one point color image are provided.

Specifically, for example, a composite image generation unit that generates a composite image by executing composition processing using a color image and a monochrome image captured from different viewpoints, and an output image generation unit that generates a one point color image in which only a partial area of the image is colored are included. The output image generation unit generates a one point color image in which a colorization area in the one point color image is set as an area to which pixel values of the composite image are output, and a non-colorization area is set as an area to which pixel values of the monochrome image are output. The colorization area is selected by either user selection or automatic selection. For example, user-specified area information, subject distance information, and the like are used for the execution.

With this configuration, an apparatus and a method capable of generating a high-quality one point color image are provided.

Note that effects described herein are merely illustrative and are not intended to be restrictive, and there may be additional effects.

BRIEF DESCRIPTION OF DRAWINGS

FIG. 1 is a diagram illustrating an example of processing of generating a one point color image.

FIG. 2 is a diagram illustrating an example of processing of generating a one point color image.

FIG. 4 is a diagram illustrating a configuration example of an image processing apparatus.

FIGS. 5A and 5B are diagrams illustrating a configuration example of a pickup device.

FIG. 6 is a diagram illustrating an image quality of a monochrome image.

FIG. 7 is a diagram illustrating an image quality of a color image.

FIG. 8 is a diagram illustrating occlusion.

FIG. 9 is a diagram illustrating a configuration example of an image processing unit.

FIGS. 13A and 13B are diagrams illustrating an example of displaying a UI on a display unit and an example of displaying an execution mode when an image is being captured.

MODE FOR CARRYING OUT THE INVENTION

Figures 3A, 3B:
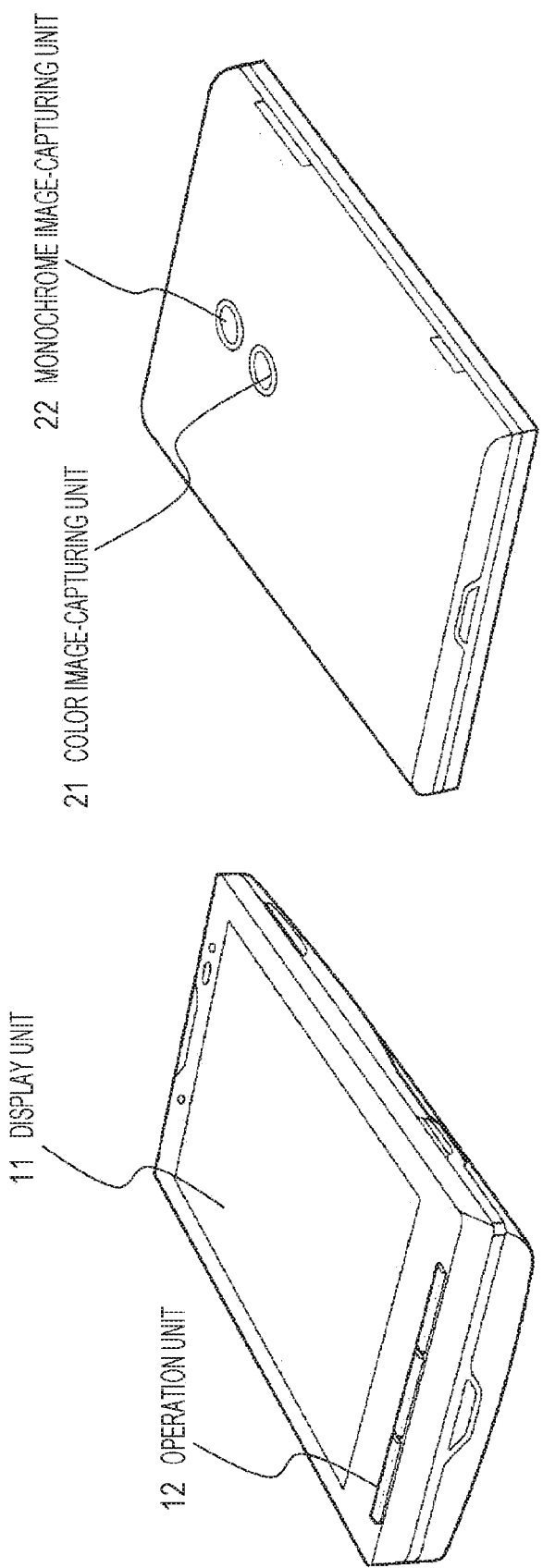
FIGS. 3A and 3B are diagrams illustrating an example of an external configuration of an image processing apparatus.

An image processing apparatus and an image processing method, and a program of the present disclosure will be described below in detail with reference to the drawings. Note that the description will be made in accordance with the following items.

1. Outline of processing of generating one point color image using color image and monochrome image
2. Configuration example of image processing apparatus
3. Processing of generating composite image executed by image processing unit
4. Operation modes executed by image processing apparatus
5. How to set colorization area in one point color image
6. Other embodiments
7. Summary of configuration of present disclosure

[1. Outline of Processing of Generating One Point Color Image Using Color Image and Monochrome Image]

First, with reference to FIG. 1 and the following drawings, a description will be made by the following two types of one point color image generation processing:

(A) processing of generating a one point color image based on a color image, and (B) processing of generating a one point color image using a color image and a monochrome image executed by the image processing apparatus of the present disclosure.

FIG. 1 is a diagram illustrating an example of processing of generating a one point color image based on a color image described in, for example, Patent Document 1 (Japanese Patent Application Laid-Open No. 2013-228689) described above.

The processing of generating a one point color image based on a color image is executed in accordance with the following processing procedure.

(Step S11)

A color image is captured.

(Step S12)

The captured color image is output to, for example, a display unit (UI) having a touch panel function, and a user selects a portion to be colored.

(Step S13)

An image processing unit executes image processing in which color information of the user-selected portion is retained and color information of the rest of the portion is deleted, thereby generating a one point color image.

(Step S14)

The one point color image generated by the image processing unit is encoded (jpg, mp4, etc.) and recorded in a storage unit.

As described above, in the conventional one point color image generation processing, a color image is used, color information of only a user-specified area is retained, and color information of the remaining area is deleted.

However, according to this method, luminance information obtained from the original color image is used as luminance information of a monochrome area.

Luminance information of a color image has a drawback that it is inferior to a monochrome image in faithful luminance level reproducibility. This is because each pixel of a color image pickup device receives input of light that has passed through a different color filter, R, G, or B.

A monochrome image pickup device can faithfully reproduce a luminance level of light incident on each pixel because the light has not passed through such a color filter.

The image processing apparatus of the present disclosure makes it possible to generate a high-quality one point color image using this luminance level reproducibility of a monochrome image.

An example of processing of generating a one point color image using a color image and a monochrome image executed by the image processing apparatus of the present disclosure will be described with reference to FIG. 2.

The processing of generating a one point color image using a color image and a monochrome image is executed in accordance with the following processing procedure.

(Steps S21a and S21b)

A color image and a monochrome image are captured.

(Step S22)

The captured color image or monochrome image is output to, for example, a display unit (UI) having a touch panel function, and a user selects a portion to be colored.

In the example illustrated in the figure, a color image is output to the display unit (UI) and a user selects a portion to be colored. Alternatively, it is possible to adopt a configuration in which a monochrome image is output to the display unit (UI) and a user selects a portion to be colored.

(Step S23)

For the user-selected portion, the image processing unit performs composition processing using the color image and the monochrome image, thereby generating a composite color image having both high-precision luminance information of the monochrome image and color information of the color image. For the portion other than the user-selected portion, the monochrome image is directly used.

By executing such image processing, a one point color image is generated.

(Step S24)

The one point color image generated by the image processing unit is encoded (jpg, mp4, etc.) and recorded in a storage unit.

As described above, the processing of the present disclosure generates a one point color image by executing image composition processing using a monochrome image having high luminance reproducibility, in which the monochrome image is combined with color information acquired from a color image only for a user-selected portion, and the monochrome image is directly used for the rest of the portion.

This processing enables generation of a high-quality one point color image in which faithful luminance information of a monochrome image is reflected.

A specific configuration and processing of the image processing apparatus that executes this processing will be described below.

Note that, in the processing example described with reference to FIG. 2, the area to be colored is selected and set by the user. However, selection of a colorization area is not limited to user selection, and various types of processing are possible. For example, selection may be automatically executed on the basis of a distance to a subject, processing of facial recognition, or the like.

Specific examples of these will be described later.

[2. Configuration example of image processing apparatus]

FIGS. 3A and 3B are diagrams illustrating a configuration example of the image processing apparatus of the present disclosure. FIGS. 3A and 3B illustrate an information processing terminal (smartphone) having a camera function, which is an example of the image processing apparatus of the present disclosure.

Note that the image processing apparatus of the present disclosure is not limited to such an information processing terminal (smartphone), but also includes, for example, an imaging device such as a camera, and a device such as a personal computer that inputs an image captured by a camera and executes image processing.

FIG. 3A illustrates a front side of an image processing apparatus 10, in which a display unit 11 and an operation unit 12 are disposed on the front side. FIG. 3B illustrates a back side of the image processing apparatus 10, in which a plurality of image-capturing units, that is, a color image-capturing unit 21 and a monochrome image-capturing unit 22 are disposed on the back side.

FIG. 4 illustrates a configuration example of a commonly used twin-lens image processing apparatus separately including a color image-capturing unit 111 and a monochrome image-capturing unit 112.

An image processing apparatus 100 includes the color image-capturing unit 111 and the monochrome image-capturing unit 112 constituting an image-capturing unit 110, an image processing unit 120, and a display unit (touch panel) 131 and a storage unit 132 as an output unit 130 to which an image processed by the image processing unit 120 is output.

Moreover, a sensor unit 141, an operation unit 142, a control unit 150, and a communication unit 160 are included.

The color image-capturing unit 111 and the monochrome image-capturing unit 112 are disposed on the same surface side of the image processing apparatus 100 as illustrated in FIG. 3B. Each of the color image-capturing unit 111 and the monochrome image-capturing unit 112, which are constituted by pickup devices such as complementary metal oxide semiconductor (CMOS) image sensors, performs photoelectric conversion of light captured by a lens (not illustrated), and generates and outputs image data of a captured image to the image processing unit 120. Furthermore, the color image-capturing unit 111 and the monochrome image-capturing unit 112 have characteristic differences.

Figures 5A, 5B:
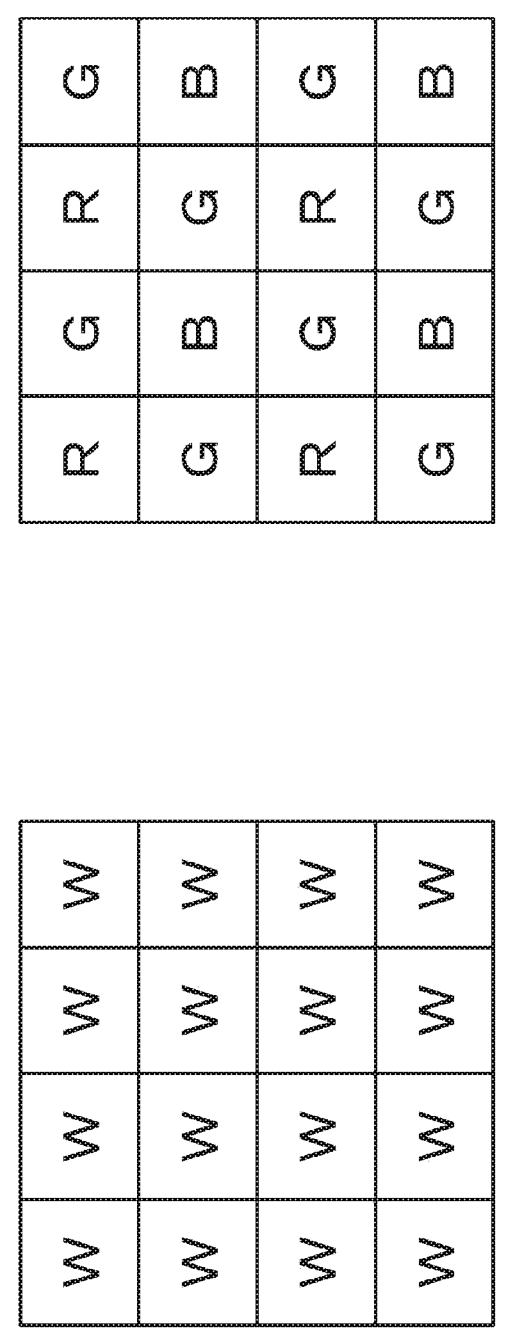

FIGS. 5A and 5B illustrate pixel arrays of the image-capturing units. FIG. 5A illustrates a pixel array of the monochrome image-capturing unit 112. In the monochrome image-capturing unit 112, all the pixels are constituted by white (W) pixels that output an electric signal based on the amount of incident light in the entire wavelength region of visible light. Consequently, the monochrome image-capturing unit 112 generates image data of a monochrome image.

FIG. 5B illustrates a pixel array of the color image-capturing unit 111. The color image-capturing unit 111 is constituted by, for example, a color filter having a Bayer array of red (R) pixels, blue (B) pixels, and green (G) pixels. In the Bayer array, diagonally positioned two pixels in a 2×2 pixel unit are green (G) pixels, and the remaining pixels are a red (R) pixel and a blue (B) pixel. That is, the color image-capturing unit 111 is constituted by color pixels, each of which outputs an electric signal based on the amount of incident light of a color component, which is one of red, blue, or green. Consequently, the color image-capturing unit 111 generates image data of a color image in which each pixel indicates one of the three primary color (RGB) components.

The image processing unit 120 generates a composite image using captured images acquired by the color image-capturing unit 111 and the monochrome image-capturing unit 112. That is, the image processing unit 120 performs image processing using captured images acquired by the color image-capturing unit 111 and the monochrome image-capturing unit 112, generates a high-quality composite image from the captured images individually acquired by the color image-capturing unit 111 or the monochrome image-capturing unit 112, and outputs the generated composite image to the display unit (touch panel) 131 and the storage unit 132 in the output unit 130. Note that a configuration and operation of the image processing unit 120 will be described later in detail.

The sensor unit 141 is constituted by a gyro sensor or the like, and detects a shake of the image processing apparatus 100. The sensor unit 141 outputs information regarding the detected shake to the control unit 150.

The communication unit 160 communicates with devices on a network such as a local area network (LAN) or the Internet.

The display unit (touch panel) 131 displays a captured image on the basis of image data supplied from the image processing unit 120, and displays a menu screen, various application screens, and the like on the basis of an information signal from the control unit 150. Note that the display unit (touch panel) 131 has a display surface having a touch panel configuration that enables using a graphical user interface function.

The operation unit 142, which is constituted by an operation switch or the like, generates an operation signal corresponding to a user operation, and outputs the operation signal to the control unit 150.

The storage unit 132 stores information generated by the image processing apparatus 100, for example, image data supplied from the image processing unit 120, and various types of information used by the image processing apparatus 100 to execute communication or an application.

The control unit 150 is constituted by a central processing unit (CPU), a read only memory (ROM), a random access memory (RAM) (not illustrated), or the like. The control unit 150 executes a program stored in the ROM or the RAM, and controls an operation of each component such that the image processing apparatus 100 performs an operation in accordance with a user operation on the touch panel or the operation unit 142 constituting the display unit (touch panel) 131.

Note that the image processing apparatus 100 is not limited to the configuration illustrated in FIG. 4, and may include, for example, an encoding processing unit for encoding image data and storing the image data in the storage unit 132, a resolution conversion unit that adjusts image data to the resolution of the display unit, and the like.

[3. Processing of Generating Composite Image Executed by Image Processing Unit]

Next, processing of generating a composite image executed by the image processing unit 120 will be described.

The image processing unit 120 illustrated in FIG. 4 performs image composition processing using a monochrome image acquired by the monochrome image-capturing unit 112 and a color image acquired by the color image-capturing unit 111.

FIG. 6 is a diagram for illustrating an image quality obtained from image composition processing using a monochrome image as a reference image. For example, by using a monochrome image as a reference, aligning a color image with the image position of the monochrome image, and then performing an image composition to generate a composite image, the luminance can be faithfully reproduced in accordance with characteristics of the lens and sensor used in the monochrome image-capturing unit 112.

On the other hand, FIG. 7 is a diagram for illustrating an image quality obtained from image composition processing using a color image as a reference image. For example, by using a color image as a reference, aligning a monochrome image with the image position of the color image, and then performing an image composition to generate a composite image, a color shift does not occur in the composite image because a color image is used as a reference, and the luminance can be faithfully reproduced in accordance with the characteristics of the lens and sensor used in the monochrome image-capturing unit 112.

However, since the monochrome image-capturing unit 112 and the color image-capturing unit 111 have different viewpoints, the risk of color shift is higher in a near view than in a distant view. Furthermore, an occlusion area increases in a near view as compared to a distant view.

An occlusion area is an area that is captured only in one image and not captured in another image due to, for example, an obstacle close to the image-capturing units and the like.

FIG. 8 illustrates an occlusion area when a monochrome image acquired by the monochrome image-capturing unit 112 is used as a reference. When occlusion occurs due to parallax, a color image acquired by the color image-capturing unit 111 does not contain image data corresponding to the occlusion area. This causes a composite image generated by image composition processing to lack color information in the occlusion area. Moreover, in a case of pixels in a near view, as compared to pixels in a distant view, a pixel corresponding to a pixel of interest in one of the captured images may not be able to calculate a parallax vector beyond the search range of parallax detection. Consequently, a composite image obtained by image composition processing may have a deteriorated image quality as compared to a color image acquired by the color image-capturing unit 111.

Furthermore, since the monochrome image-capturing unit 112 has a higher sensitivity than the color image-capturing unit 111 using a color filter, in a case of a subject having a higher luminance, pixel saturation is likely to occur as compared to the color image-capturing unit 111. In a case of a monochrome image having a larger number of saturated pixels as described above, the composite image becomes a color image having a deteriorated image quality in which a larger portion of the subject has a high luminance and is saturated as compared to the color image acquired by the color image-capturing unit 111.

To cope with this problem, the image processing unit 120 performs, on the basis of captured images, an image composition determination to determine whether or not a deterioration in image quality caused by parallax or pixel saturation may occur. In accordance with a result of the image composition determination, the image processing unit 120 generates one of the following two types of composite image:

a composite image using a color image acquired by the color image-capturing unit 111 as a reference image, or a composite image using a monochrome image acquired by the monochrome image-capturing unit 112 as a reference image.

FIG. 9 is a diagram illustrating a detailed configuration example of the image processing unit 120.

The image processing unit 120 includes preprocessing units 121 and 122, a parallax detection unit 123, a feature amount calculation unit 124, an image quality determination unit 125, a composite image generation unit 126, and an output image generation unit (selection/composition) 127.

The preprocessing units 121 and 122 perform image correction processing such as lens distortion correction, defective pixel correction, and white balance adjustment on image data of captured images acquired by the color image-capturing unit 111 and the monochrome image-capturing unit 112. The corrected image data is output to the parallax detection unit 123, the feature amount calculation unit 124, the image quality determination unit 125, the composite image generation unit 126, and the output image generation unit (selection/composition) 127.

The parallax detection unit 123 performs parallax detection on the basis of monochrome image data and color image data supplied from the preprocessing units 121 and 122.

Since the monochrome image-capturing unit 112 and the color image-capturing unit 111 capture images from different viewpoint positions as illustrated in FIG. 3B, a captured image acquired by the monochrome image-capturing unit 112 and a captured image acquired by the color image-capturing unit 111 have parallax.

The parallax detection unit 123 performs corresponding point detection processing such as block matching to detect parallax on a pixel-by-pixel basis. This detection information is output to the feature amount calculation unit 124.

The feature amount calculation unit 124 inputs pixel-by-pixel or image area by image area parallax information of the two pieces of image data detected by the parallax detection unit 123, and calculates image feature amounts, specifically, a distribution in the parallax, the size (percentage) of the occlusion area, and the like.

A specific configuration example and processing of the feature amount calculation unit 124 will be described later.

Information regarding the feature amounts calculated by the feature amount calculation unit 124 is output to the image quality determination unit 125.

The image quality determination unit 125 determines an image quality and the like of a composite image on the basis of the information regarding the feature amounts calculated by the feature amount calculation unit 124. Specifically, for example, image qualities of composite images:

(a) a color image-based composite image, and (b) a monochrome image-based composite image are determined.

A result of this determination is output to the composite image generation unit 126 and the output image generation unit (selection/composition) 127.

On the basis of the result of the determination by the image quality determination unit 125, the composite image generation unit 126 generates a composite image, which is one of (a) a color image-based composite image, or (b) a monochrome image-based composite image.

A reference image is an image serving as a reference used to generate a composite image.

In a case where a color image is set as a reference image, the composite image generation unit 126 uses color image data supplied from the preprocessing unit 121 as a base to perform pixel value correction based on luminance information obtained from a monochrome image, thereby generating a composite image.

On the other hand, in a case where a monochrome image is set as a reference image, the composite image generation unit 126 uses monochrome image data supplied from the preprocessing unit 122 as a base to perform pixel value correction based on color information obtained from a color image, thereby generating a composite image.

The image quality determination unit 125 determines which of the two types of composite image:

a composite image generated using a monochrome image as a reference image, or a composite image generated using a color image as a reference image can have a higher quality.

A specific example of this determination processing will be described below.

The image quality determination unit 125 uses feature amount information input from the feature amount calculation unit 124 to determine which of a color image or a monochrome image is to be set as a reference image.

Specifically, which of the color image or the monochrome image is to be set as a reference image is determined on the basis of, for example, parallax information of two pieces of image data and occlusion area detection information.

An example of this reference image determination processing will be described with reference to FIG. 10.

Figure 10:
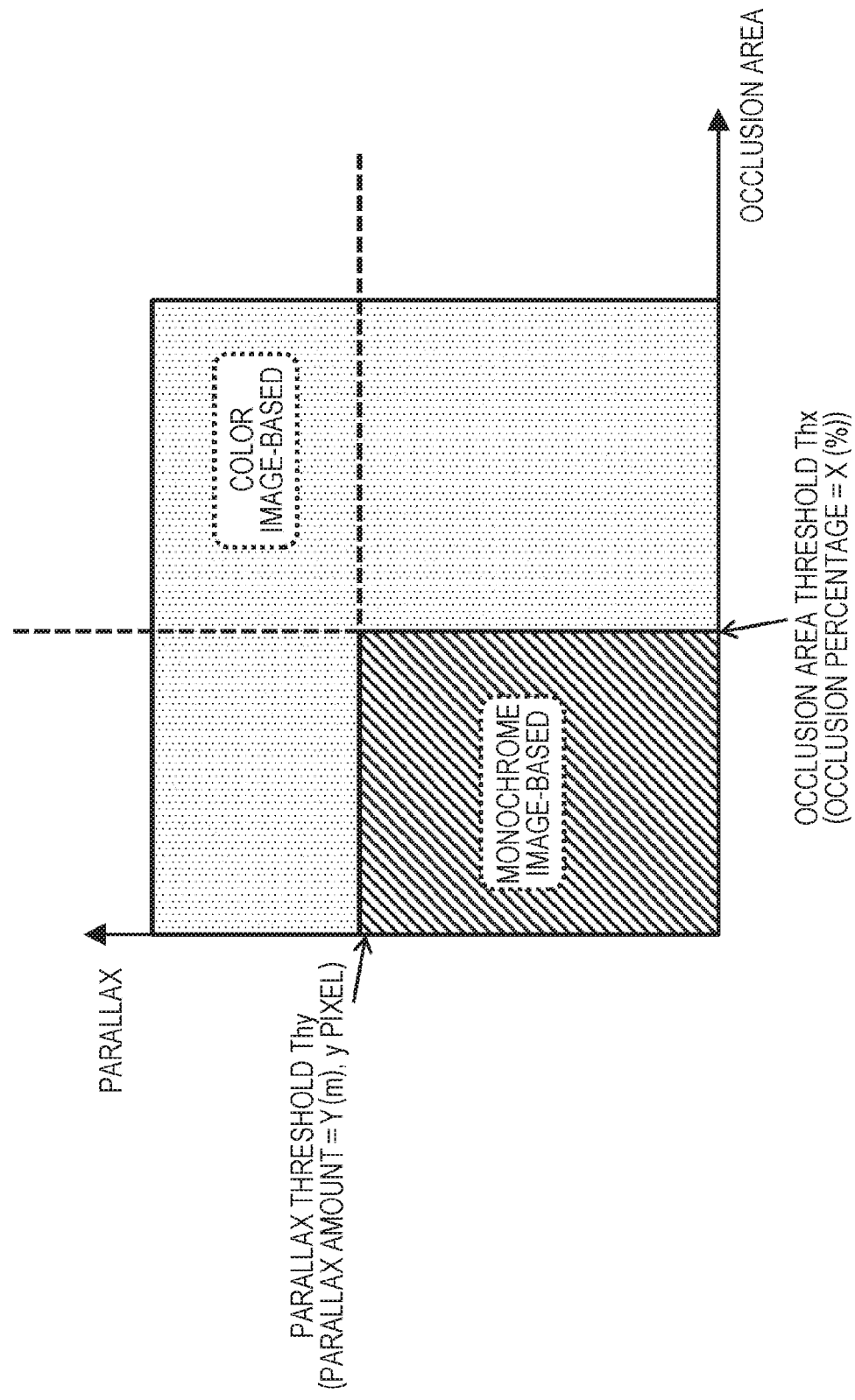
FIG. 10 is a diagram illustrating an example of reference image determination processing.

FIG. 10 illustrates a graph showing occlusion area on the horizontal axis and parallax on the vertical axis.

The occlusion area on the horizontal axis corresponds to the percentage (%) of an occlusion area included in image areas of two images, a color image captured by the color image-capturing unit 111 and a monochrome image captured by the monochrome image-capturing unit 112.

The parallax on the vertical axis represents parallax (for example, the number of pixels) between two images, a color image captured by the color image-capturing unit 111 and a monochrome image captured by the monochrome image-capturing unit 112.

A reference image determination unit 124 first calculates the occlusion percentage and the parallax for each divided area obtained by dividing an image.

This processing will be described with reference to FIG. 11.

Figure 11:
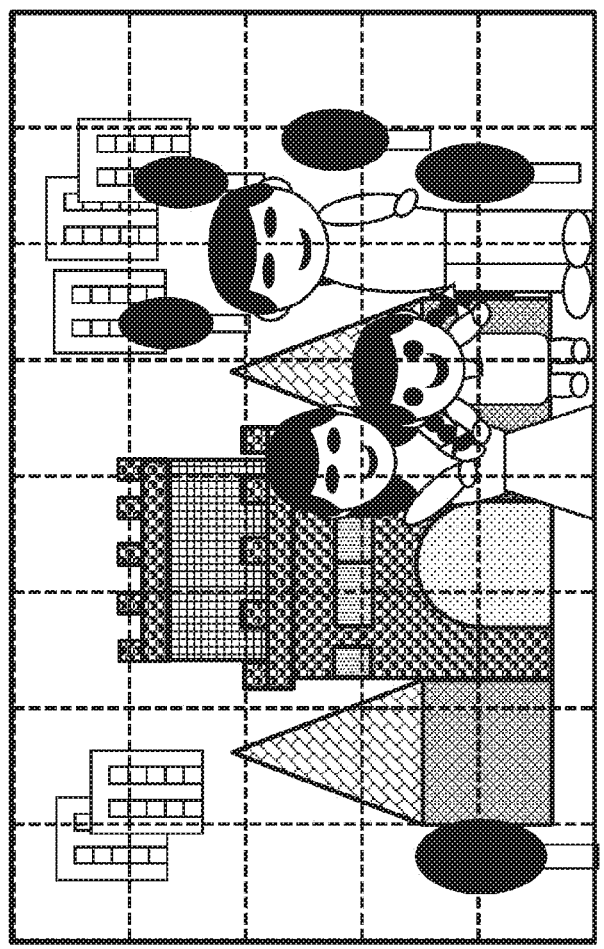
FIG. 11 is a diagram illustrating an example of reference image determination processing.

FIG. 11 illustrates a captured image, which is a color image captured by the color image-capturing unit 111 or a monochrome image captured by the monochrome image-capturing unit 112.

The reference image determination unit 124 selects one of the two images, and sets a plurality of divided areas in the selected image. The divided areas are the areas defined by dotted lines illustrated in FIG. 11.

The reference image determination unit 124 calculates the occlusion percentage and the parallax (average value) for each divided area.

For example, in the example illustrated in FIG. 11, 8×5=40 divided areas are set, and 40 occlusion percentages and 40 parallaxes (average values) are calculated.

The 40 occlusion percentages and 40 parallaxes (average values) are plotted on the graph illustrated in FIG. 10.

That is, coordinates (x, y), where x is an occlusion percentage, and y is a parallax (average value), are plotted on the graph illustrated in FIG. 10.

As a result of this processing, in a case where, for example, 50% or more of the coordinates are included in a color image reference area, the color image is used as a reference image.

Alternatively, in a case where 50% or more of the coordinates are included in a monochrome image reference area, the monochrome image is used as a reference image.

The reference image determination unit 124 performs such processing to determine a reference image.

Note that the above-described processing example is an example, and other types of processing can also be used.

For example, processing may be performed in which a large weight is set for a divided area at the center of an image such that the occlusion percentage and the parallax (average value) of that central area are more greatly reflected in determination of a reference image.

Alternatively, processing of increasing a weight for a divided area detected as a face area and then determining a reference image may be performed.

As understood from the graph illustrated in FIG. 10, in a case where the occlusion percentage is less than a threshold Thx and the parallax is less than a parallax threshold Thy, the monochrome image is used as a reference image.

On the other hand, in a case where the occlusion percentage is equal to or larger than the threshold Thx or the parallax is equal to or larger than the parallax threshold Thy, the color image is used as a reference image.

The image quality determination unit 125 performs such processing to determine a reference image.

In a case where the occlusion percentage is small and the parallax is small, a high-quality image can be generated using a monochrome image as a reference image and applying faithful luminance information of the monochrome image to the entire image.

That is, in a case where the occlusion percentage is small and the parallax is small, the area for which color information cannot be acquired from a color image due to occlusion is small, and there is little problem of color shift due to parallax. Thus, a monochrome image is used as a reference image to generate a high-quality monochrome image-based composite image in which faithful luminance information of the monochrome image is applied to the entire image.

On the other hand, in a case where the occlusion percentage is large or the parallax is large, there is a possibility that the area where color information cannot be acquired from a color image due to occlusion is large, or the area where a problem of color shift due to parallax occurs increases. In order to reduce these problems, the color image is used as a reference image to generate a color image-based composite image.

Note that, also in a case of a color image-based composite image, luminance information of a monochrome image is applied when the composite image is generated.

Note that the reference image determination processing described with reference to FIGS. 10 and 11 is an example, and the image quality determination unit 125 uses other image feature amounts to determine image qualities of (a) a color image-based composite image, and (b) a monochrome image-based composite image.

Information regarding a result of this determination is output also to the output image generation unit (selection/composition) 127.

On the basis of this determination result, the output image generation unit (selection/composition) 127 selects and outputs one of (a) a color image-based composite image, or (b) a monochrome image-based composite image generated by the composite image generation unit 126.

Alternatively, in addition to one of those composite images, (c) a color monocular image captured by the color image-capturing unit 111, and (d) a monochrome monocular image captured by the monochrome image-capturing unit 112 are used to generate a composite image, and the composite image is output.

The composite image is output to the display unit (touch panel) 131 and the storage unit 132 via the output image generation unit (selection/composition) 127.

Note that, in a case of generating a one point color image in which a partial area of the image is colored, the output image generation unit (selection/composition) 127 performs the following processing.

An image, which is one of (a) a color image-based composite image, or (b) monochrome image-based composite image, is used for an image area to be a one point color portion, and a monochrome image, which is (d) a monochrome monocular image captured by the monochrome image-capturing unit 112, is used for the remaining monochrome area, and thus a one point color image is generated.

That is, the output image generation unit (selection/composition) 127 generates a one point color image by setting a colorization area in the one point color image as an area to which pixel values of a composite image generated on the basis of a color image and a monochrome image are output, and setting the remaining non-colorization area not to be colored in the one point color image as an area to which pixel values of a monochrome monocular image captured by the monochrome image-capturing unit 112 are output.

The generated one point color image is output from the output image generation unit (selection/composition) 127 to the display unit (touch panel) 131 and the storage unit 132.

As described above, in a case of generating a one point color image, the image processing unit 120 generates and outputs a composite image in which an image area to be colored is a composite image of a color image and a monochrome image, and an area not to be colored is a monochrome monocular image captured by the monochrome image-capturing unit 112.

By performing this processing, it is possible to generate a high-quality one point color image in which a faithful luminance level of a monochrome image is reproduced over the entire image.

[4. Operation Modes Executed by Image Processing Apparatus]

Next, operation modes executed by the image processing apparatus 100 of the present disclosure will be described.

Figure 12:
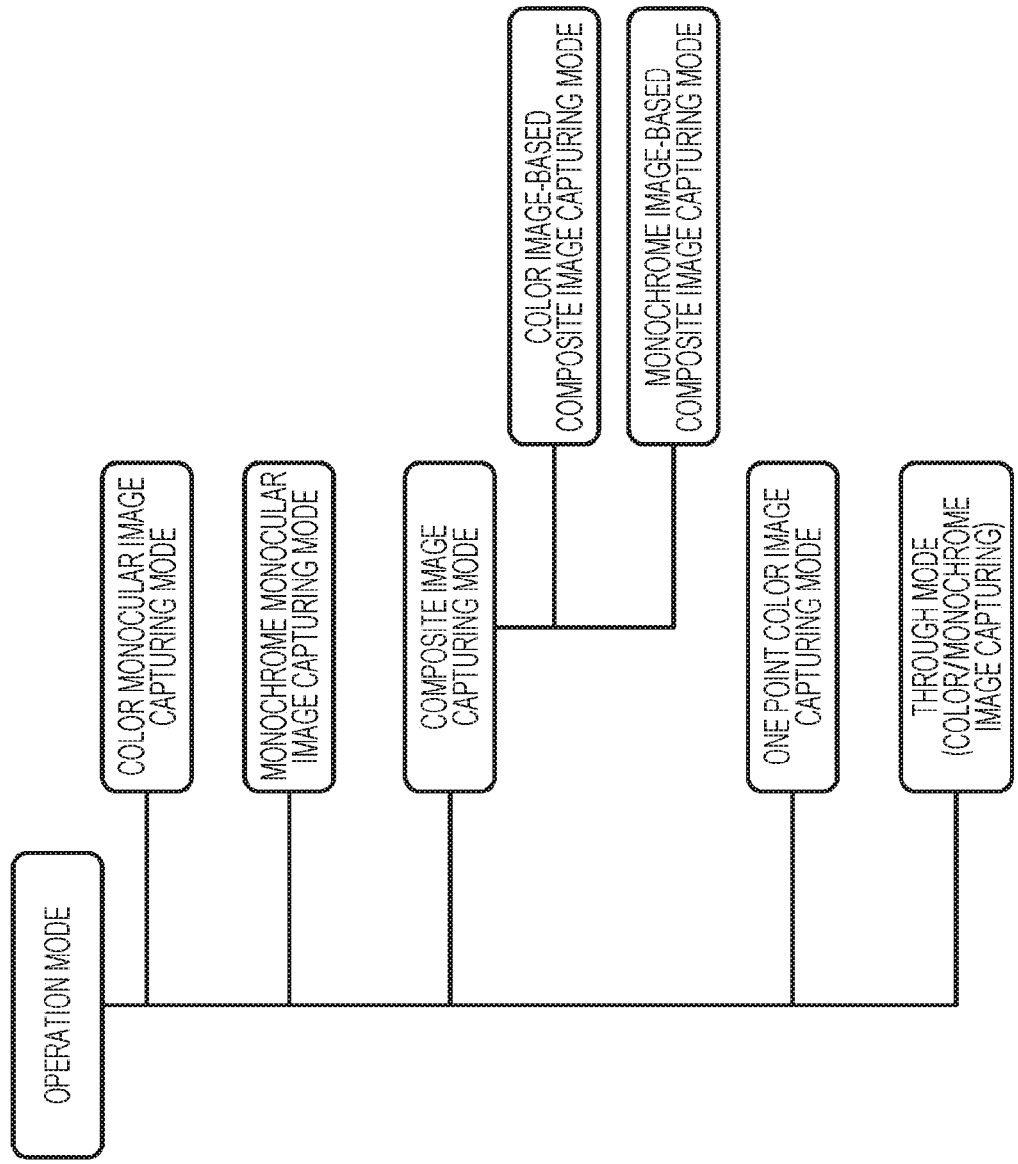
FIG. 12 is a diagram illustrating operation modes of the image processing apparatus.

FIG. 12 is a diagram illustrating the operation modes that can be executed by the image processing apparatus 100 of the present disclosure. As illustrated in FIG. 12, the operation modes that can be executed by the image processing apparatus 100 of the present disclosure include the following modes.

(1) Color monocular image capturing mode
(2) Monochrome monocular image capturing mode
(3) Composite image capturing mode
(4) One point color image capturing mode
(5) Through mode Moreover, (3) composite image capturing mode includes the following two modes:

(3a) color image-based composite image capturing mode, and (3b) monochrome image-based composite image capturing mode.

(1) Color Monocular Image Capturing Mode

In this mode, the color image-capturing unit 111 is used to capture and record a color monocular image.

(2) Monochrome Monocular Image Capturing Mode

In this mode, the monochrome image-capturing unit 112 is used to capture and record a monochrome monocular image.

(3) Composite Image Capturing Mode

In this mode, a composite image is generated using a color image captured by the color image-capturing unit 111 and a monochrome image captured by the monochrome image-capturing unit 112, and the generated composite image is recorded.

Note that this composite image capturing mode includes the following two modes:

(3a) color image-based composite image capturing mode, and (3b) monochrome image-based composite image capturing mode.

(3a) Color Image-Based Composite Image Capturing Mode

In this mode, a color image is used as a reference, a monochrome image is aligned with an image position of the color image, and then an image composition is performed to generate a composite image. Since a color image is used as a reference, a color shift does not occur in the composite image, and the luminance can be faithfully reproduced in accordance with the characteristics of the lens and sensor used in the monochrome image-capturing unit 112.

(3b) Monochrome Image-Based Composite Image Capturing Mode

In this mode, a monochrome image is used as a reference, a color image is aligned with an image position of the monochrome image, and then an image composition is performed to generate a composite image. Also in this case, the luminance can be faithfully reproduced in accordance with the characteristics of the lens and sensor used in the monochrome image-capturing unit 112.

(4) One Point Color Image Capturing Mode

In this mode, an image is generated in which only a partial area of the image is colored and the remaining area (non-colorization area) is monochrome.

The color image area in the one point color image is a composite image using a color image captured by the color image-capturing unit 111 and a monochrome image captured by the monochrome image-capturing unit 112, and the remaining non-colorization area is generated using the monochrome image captured by the monochrome image-capturing unit 112.

Note that the composite image of the color image area in the one point color image is either a color image-based composite image or a monochrome image-based composite image.

The image processing unit 120 performs an image quality determination to determine which composite image is expected to have a higher quality, and generates one of the composite images, whichever enables generation of a composite image having a higher image quality.

(5) Through Mode

In this mode, a color image captured by the color image-capturing unit 111 and a monochrome image captured by the monochrome image-capturing unit 112 are directly recorded in the storage unit.

In the color image and the monochrome image captured in the through mode, synchronization information regarding the image capture time is recorded mutually as metadata.

Images stored in the storage unit can be used to generate a composite image or a one point color image.

A user can freely select which of these modes, that is, (1) color monocular image capturing mode,
(2) monochrome monocular image capturing mode,
(3) composite image capturing mode,
(4) one point color image capturing mode, or
(5) through mode to use to capture or record an image.

An example of a user interface (UI) for mode selection is illustrated in FIG. 13A.

FIG. 13A illustrates an example in which a mode selection UI 251 is displayed on the display unit (touch panel) 131.

A user can use this mode selection UI 251 to select which mode to use to capture an image.

In the example illustrated in FIG. 13A, the user has selected the one point color mode.

Note that, while the mode can be set by the user, for example, in the composite image capturing mode, the mode is automatically switched between the following image capturing modes:

(3a) color image-based composite image capturing mode, and (3b) monochrome image-based composite image capturing mode.

The image processing unit 120 determines which of these two modes has a higher quality, and the mode is switched automatically so that a high-quality composite image can be generated.

For example, when a moving image is captured, the mode is automatically switched between these two modes depending on the situation of image capturing.

FIG. 13B is a display example of the display unit (touch panel) 131 in a case where a user has selected the one point color mode. In this example, execution mode information 252 is displayed along with image data being captured.

Figure 14:
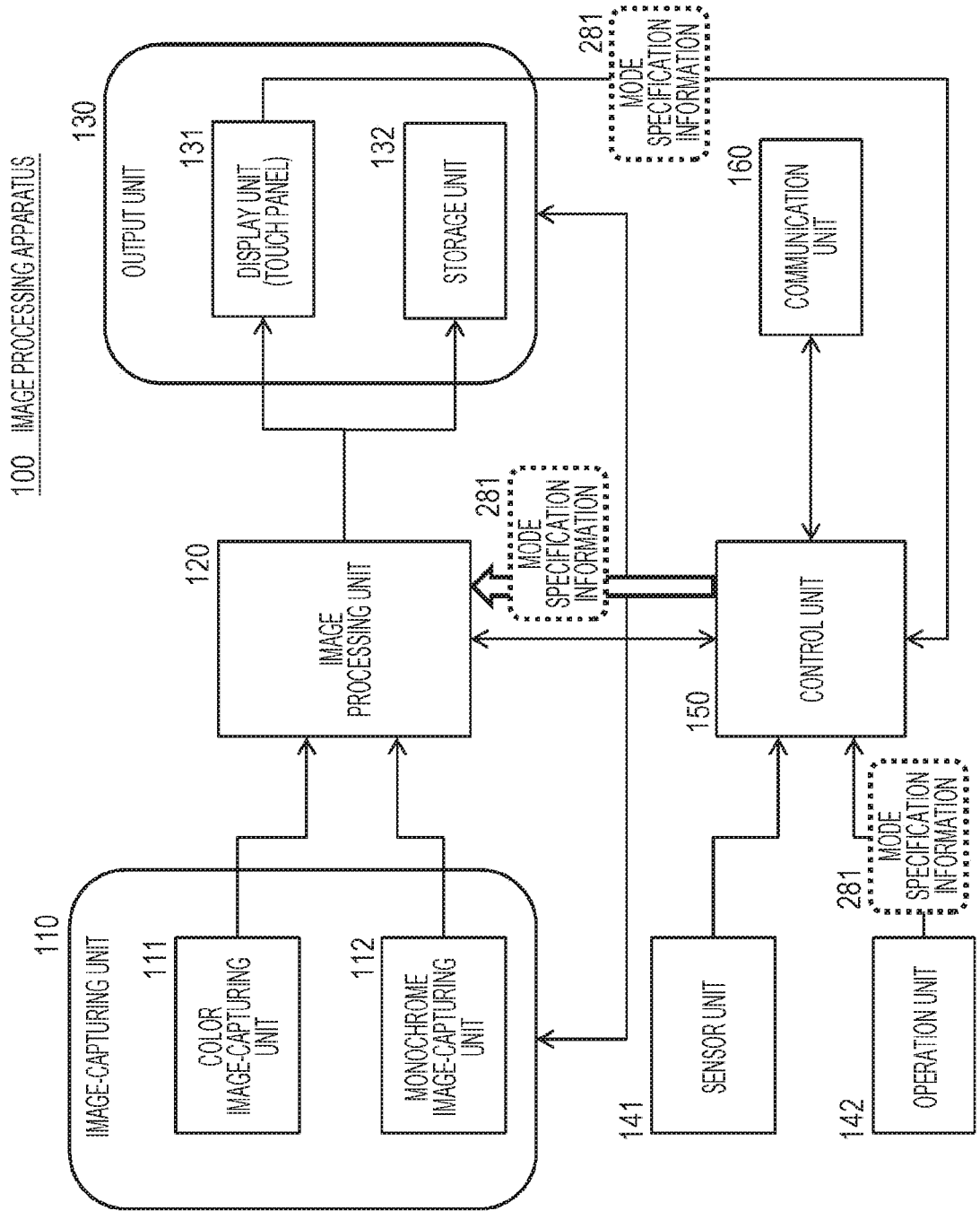
FIG. 14 is a diagram illustrating a configuration and processing of the image processing apparatus of the present disclosure.

Note that, in a case where the mode has been specified by the user, the mode specification information is input to the image processing unit 120 via the control unit 150 of the image processing apparatus, as illustrated in FIG. 14.

As illustrated in FIG. 14, mode specification information 281 is input via the display unit (touch panel) 131 or the operation unit 142, and is input to the image processing unit 120 via the control unit 150.

The image processing unit 120 performs processing in accordance with the mode specification information that has been input. That is, (1) in a case where mode specification information for selecting the color monocular image capturing mode has been input, a color monocular image captured using the color image-capturing unit 111 is output to the output unit 130 (the display unit 131 and the storage unit 132).

(2) In a case where mode specification information for selecting the monochrome monocular image capturing mode has been input, a monochrome monocular image captured using the monochrome image-capturing unit 112 is output to the output unit 130 (the display unit 131 and the storage unit 132).

(3) In a case where mode specification information for selecting the composite image capturing mode has been input, a composite image is generated using a color image captured by the color image-capturing unit 111 and a monochrome image captured by the monochrome image-capturing unit 112, and the generated composite image is output to the output unit 130 (the display unit 131 and the storage unit 132).

In the composite image capturing mode, the image processing unit 120 executes image quality determination processing. That is, an image quality determination is performed to determine which of a color image-based composite image or a monochrome image-based composite image is expected to have a higher quality, and a composite image is generated in one of the modes, whichever enables generation of a high-quality composite image.

(4) In a case where mode specification information for selecting the one point color image capturing mode has been input, an image is generated in which only a partial area of the image is colored and the remaining area is monochrome. The image processing unit 120 generates the color image area in the one point color image from a composite image using a color image captured by the color image-capturing unit 111 and a monochrome image captured by the monochrome image-capturing unit 112. The remaining area is the monochrome image captured by the monochrome image-capturing unit 112. The one point color image generated as described above is output to the output unit 130 (the display unit 131 and the storage unit 132).

Note that, as described above, the composite image of the color image area in the one point color image is either a color image-based composite image or a monochrome image-based composite image, and the image processing unit 120 performs an image quality determination to determine which composite image is expected to have a higher image quality, and generates one of the composite images, whichever enables generation of a high-quality composite image.

(5) In a case where mode specification information for selecting the through mode has been input, a color image captured by the color image-capturing unit 111 and a monochrome image captured by the monochrome image-capturing unit 112 are directly output to the output unit 130 (the display unit 131 and the storage unit 132).

[5. How to Set Colorization Area in One Point Color Image]

To set a colorization area in a one point color image, a part of the image displayed on the display unit (touch panel) 131 can be selected as described earlier with reference to FIG. 2.

Figure 15:
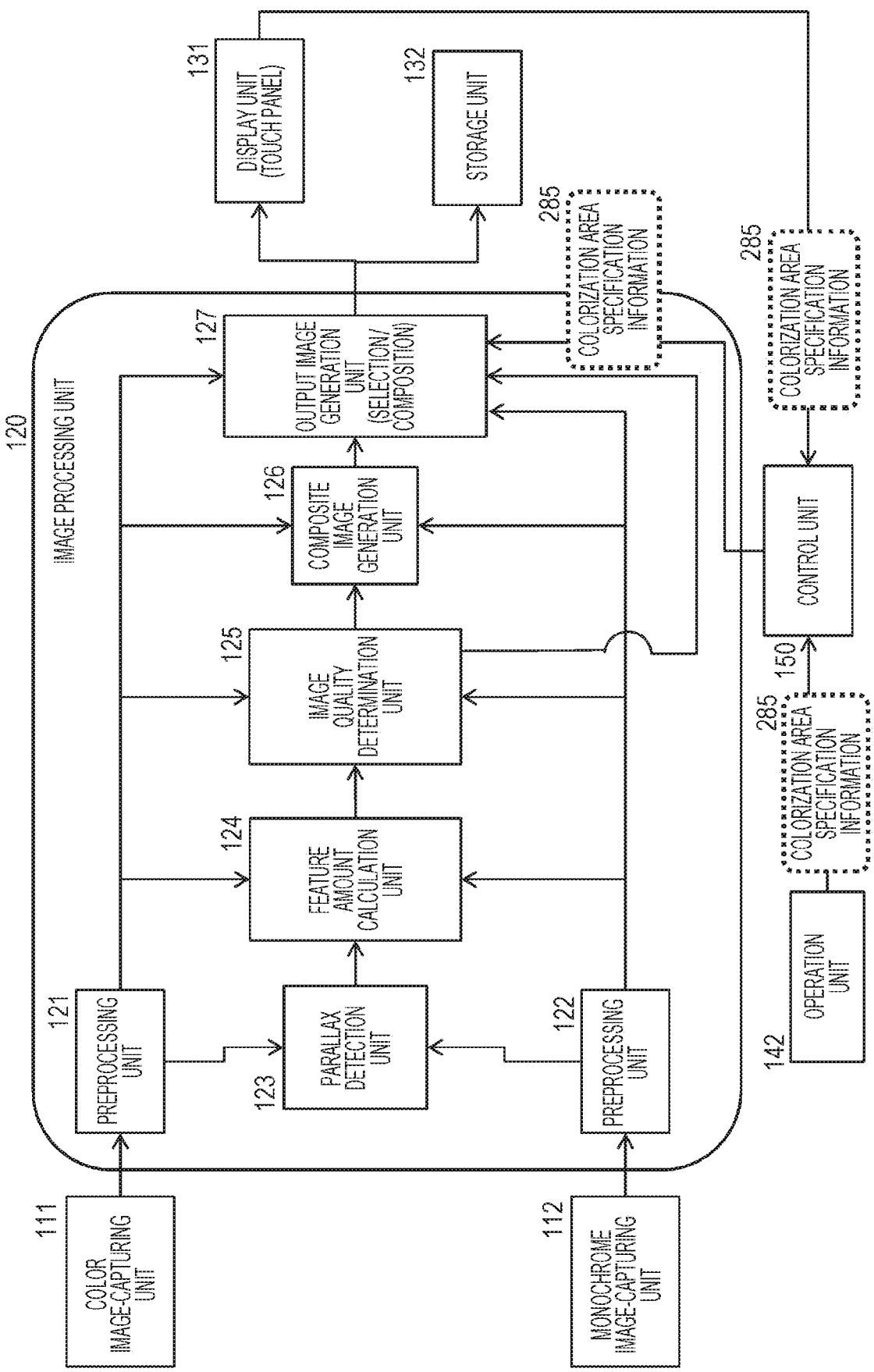
FIG. 15 is a diagram illustrating a configuration and processing of the image processing apparatus of the present disclosure.

As illustrated in FIG. 15, the colorization area specification information 285 from a user is input to the output image generation unit (selection/composition) 127 of the image processing unit 120 via the control unit 150.

The colorization area specification information 285 includes, for example, information regarding a pixel position on the display unit (touch panel) 131 touched by the user.

The output image generation unit (selection/composition) 127 of the image processing unit 120 estimates, from edge information of the image and the like, an area estimated to be the same subject as the subject located at the pixel position touched by the user, and sets the subject as an area to be colored.

For this colorization area, pixel values are set using a composite image input from the composite image generation unit 126.

For the remaining area (non-colorization area), an image is generated by applying a monochrome image captured by the monochrome image-capturing unit 112.

Note that, at the time of this image composition processing, correction is made as necessary so that there is no misalignment at the connection between the images.

In a case where the composite image input from the composite image generation unit 126 is a monochrome image-based composite image, the composite image has been generated by aligning a color image with the image position of the monochrome image and then performing an image composition. Thus, the composite image is free of misalignment with the monochrome image captured by the monochrome image-capturing unit 112, and can be directly used for composition processing.

However, in a case where the composite image input from the composite image generation unit 126 is a color image-based composite image, the composite image has been generated by aligning the monochrome image with the image position of the color image and then performing an image composition. Thus, there may be misalignment with the monochrome image captured by the monochrome image-capturing unit 112. In this case, for example, the correspondence between the images is detected by corresponding point detection processing such as block matching to eliminate the misalignment and perform composition processing.

A one point color image generated as described above by the output image generation unit (selection/composition) 127 of the image processing unit 120 is output to the output unit 130 (the display unit 131 and the storage unit 132).

Note that, in a one point color image generation mode, modes for selecting an area to be colored include a manual mode in which the selection is made by a user and an auto mode in which the selection is automatically made by the image processing apparatus 100.

Each of these modes will be described with reference to FIG. 16.

Figure 16:
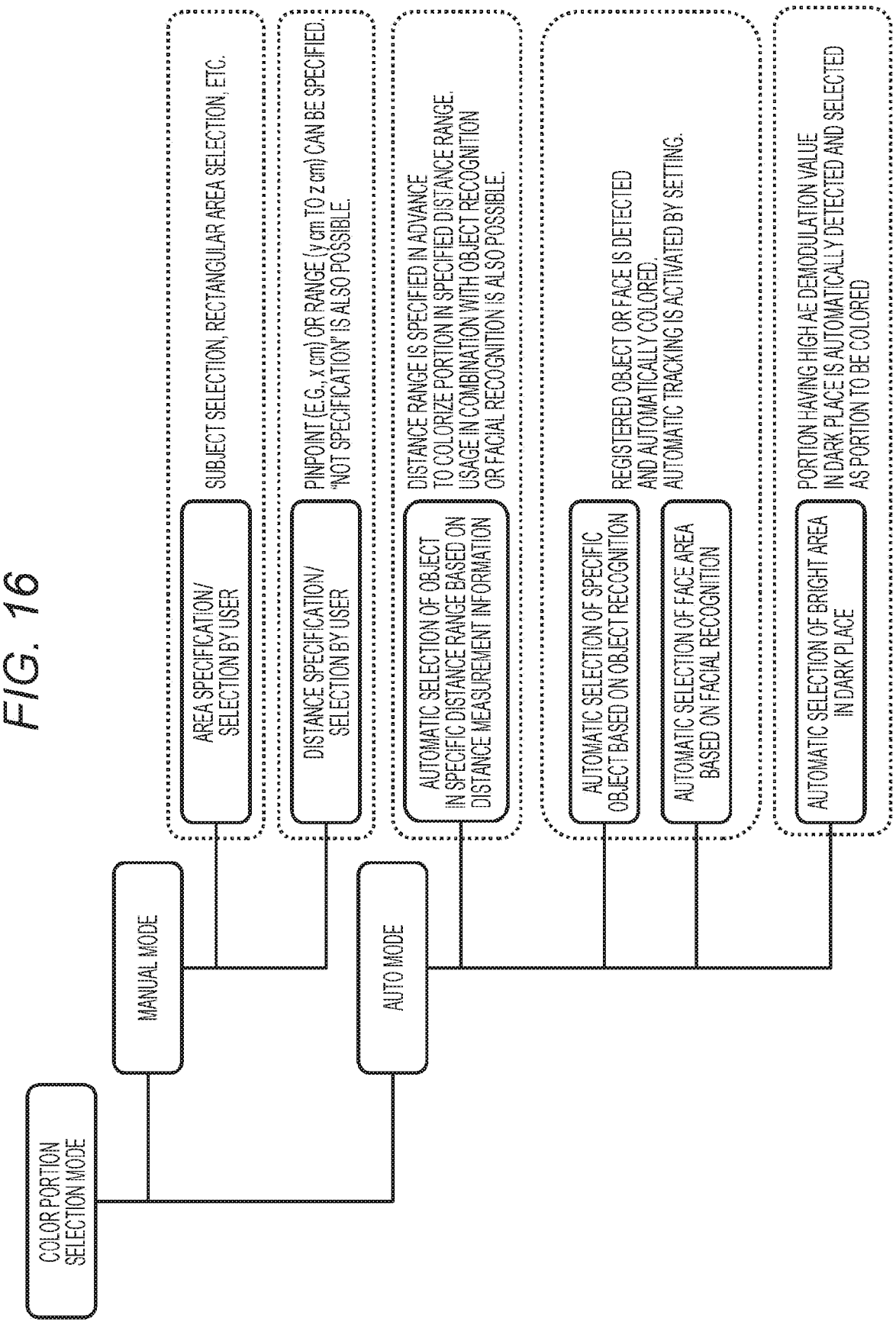
FIG. 16 is a diagram illustrating an example of color area selection processing executed by the image processing apparatus of the present disclosure.

As illustrated in FIG. 16, (A) manual mode offers the following two selection methods:

(a1) area specification/selection by user, and (a2) distance specification/selection by user.

Furthermore, (B) auto mode offers the following selection methods:

(b1) automatic selection of object in specific distance range based on distance measurement information, (b2) automatic selection of specific object based on object recognition, (b3) automatic selection of face area based on facial recognition, and (b4) automatic selection of bright area in dark place.

Note that all of these types of selection processing can be applied when capturing a still image or a moving image, and can also be applied to a preview image before image capture.

For example, at the stage of displaying a preview image before image capture on the display unit 131, a one point color image can be displayed for confirmation. Thereafter, by performing a recording start operation, a still image or a moving image can be recorded as a one point color image retaining the setting of the colorization area.

Furthermore, also when a moving image is being captured, while the image is being captured, a one point color image based on the captured image can be recorded while being displayed for confirmation on the display unit 131.

In (A) manual mode, (a1) Area specification/selection by user corresponds to the processing of step S22 described earlier with reference to FIG. 2, and is a method for a user to select a portion to be colored. As described with reference to FIG. 2, an image is output to the display unit (UI), and the user selects a portion to be colored.

This selection can be made by selecting a specific subject area, specifying and selecting a rectangular area, or the like.

The image processing unit 120 inputs area specification information set by the user, and performs processing of colorizing an object in the area.

(a2) Distance specification/selection by user is a method in which a user sets in advance a distance range of a subject that the user wants to colorize, the subject being selected from various subjects included in an image captured by an image-capturing unit.

A distance from a camera (image processing apparatus) to a subject to be colored is specified, for example, a distance of about 70 cm (pinpoint), a distance range of 1 m to 2 m, or the like from the camera.

After acquiring information regarding distances to subjects included in a captured image, the image processing unit 120 inputs distance specification information set by the user, and performs processing of colorizing an object at that distance.

Note that the user can specify not only a range of distance to a subject to be colored but also a range of distance to a subject not to be colored.

Furthermore, in (B) auto mode, (b1) automatic selection of object in specific distance range based on distance measurement information is a method of setting a distance range to be colored, not using data regarding specification by a user, but using distance information recorded in advance in a memory in the apparatus.

After acquiring information regarding distances to subjects included in a captured image, the image processing unit 120 inputs prescribed distance information stored in the memory, and performs processing of colorizing an object at that distance.

(b2) Automatic selection of specific object based on object recognition

In this method, information regarding a shape of an object to be colored, such as a car or a person, for example, is registered in advance in a storage unit of a camera (image processing apparatus), and an object that coincides with or resembles the shape information is colored.

The image processing unit 120 analyzes shapes of various objects included in a captured image, selects an object that coincides with or resembles the registered shape information, and colorizes the object.

(b3) Automatic selection of face area based on facial recognition is a method of coloring a face area recognized by facial recognition processing.

The image processing unit 120 selects a face area selected from a captured image by facial recognition processing, and colorizes the face area.

(b4) Automatic selection of bright area in dark place

In this method, for example, a bright portion in an image captured in a dark environment is detected and colored.

For example, the image processing unit 120 analyzes an automatic exposure (AE) demodulation value of an image captured in a dark environment, determines that an area having a high exposure demodulation value is a bright portion, and colorizes the area.

Note that a function for performing the methods described with reference to FIG. 16 is included in the image processing apparatus 100.

That is, the image processing apparatus 100 has processing functions such as subject distance detection, object shape analysis, face area detection, and AE demodulation value analysis, for example, and analysis information to which these configurations have been applied is input to the image processing unit 120. The image processing unit 120 determines a colorization area in accordance with the analysis information.

The output image generation unit (selection/composition) 127 of the image processing unit 120 generates and outputs a one point color image in which an image area to be colored is a composite image of a color image and a monochrome image generated by the composite image generation unit 126, and an area not to be colored is a monochrome monocular image captured by the monochrome image-capturing unit 112.

By performing this processing, it is possible to generate a high-quality one point color image in which a faithful luminance level of a monochrome image is reproduced over the entire image.

[6. Other Embodiments]

Next, other embodiments will be described. The description will cover the following embodiments.

(1) Autofocus (AF) processing based on colorization area (2) Automatic exposure (AE) processing based on colorization area (1) Autofocus (AF) Processing Based on Colorization Area As described earlier with reference to FIG. 16, in a case of generating a one point color image, various colorization area selection methods can be applied.

User selection or automatic selection can be used, and autofocus (AF) processing is executed to focus on a colorization area selected by such a method.

Colorization area determination information is input to an AF control unit of a camera (image processing apparatus), and the AF control unit executes control for focusing on the colorization area.

By performing such processing, it is possible to capture and record a one point color image focused on the colorization area in the one point color image.

(2) Automatic Exposure (AE) Processing Based on Colorization Area

This is used to execute optimal automatic exposure (AE) processing for a subject in a colorization area selected by a user or automatically selected.

Colorization area determination information is input to an exposure control unit (AE control unit) of a camera (image processing apparatus), and the AE control unit executes optimal exposure control (AE) for a subject in the colorization area.

By performing such processing, it is possible to capture an image of the subject in the colorization area in the one point color image with optimal exposure, and it is possible to capture and record a one point color image in which the subject in the color area is clearer.

[7. Summary of Configuration of Present Disclosure]

The embodiment of the present disclosure has been described above in detail with reference to the specific embodiments. However, it is obvious that those skilled in the art may make modifications and substitutions to the embodiments without departing from the scope of the present disclosure. That is, the present invention has been disclosed in a form of illustration, and should not be construed as limiting. In order to determine the gist of the present disclosure, the claims should be taken into consideration.

Note that the technology disclosed in the present specification may have the following configurations.

(1) An image processing apparatus including:

a composite image generation unit that generates a composite image by executing composition processing using a color image and a monochrome image captured from different viewpoints; and an output image generation unit that generates a one point color image in which only a partial area of the image is colored, in which the output image generation unit generates a one point color image in which a colorization area in the one point color image is set as an area to which pixel values of the composite image are output, and a non-colorization area in the one point color image is set as an area to which pixel values of the monochrome image are output.

(2) The image processing apparatus according to (1), in which the composite image generation unit is configured to generate either (a) a color image-based composite image, or (b) a monochrome image-based composite image, and generates one of the two composite images (a) and (b), whichever is determined to have a higher quality by image quality determination processing.

(3) The image processing apparatus according to (1) or (2), in which the output image generation unit generates a one point color image in which a colorization area in the one point color image is set as an area to which pixel values of either (a) a color image-based composite image, or (b) a monochrome image-based composite image are output, the composite image (a) or (b) being generated by the composite image generation unit.

(4) The image processing apparatus according to any one of (1) to (3), in which the output image generation unit inputs colorization area selection information for a one point color image, and generates a one point color image in which an area determined in accordance with the input colorization area selection information is set as a colorization area.

(5) The image processing apparatus according to any one of (1) to (4), in which processing of selecting a colorization area in a one point color image is executed in either manual mode for user selection, or auto mode for automatic selection.

(6) The image processing apparatus according to any one of (1) to (5), in which processing of selecting a colorization area in a one point color image is executed by selection of an area by a user or selection of a distance to a subject, and the output image generation unit inputs colorization area selection information set by the user, and generates a one point color image in which the area selected by the user is set as a colorization area in accordance with the input colorization area selection information.

(7) The image processing apparatus according to any one of (1) to (5), in which a colorization area in a one point color image is automatically determined in accordance with distances to subjects included in a captured image, and the output image generation unit inputs colorization area selection information based on the distances to the subjects, and generates a one point color image in which an area of a subject at a specific distance is set as a colorization area in accordance with the input colorization area selection information.

(8) The image processing apparatus according to any one of (1) to (5), in which a colorization area in a one point color image is automatically determined in accordance with objects included in a captured image, and the output image generation unit inputs colorization area selection information based on the objects, and generates a one point color image in which an area of a specific object is set as a colorization area in accordance with the input colorization area selection information.

(9) The image processing apparatus according to any one of (1) to (5), in which a colorization area in a one point color image is a face area detected by facial recognition processing from a captured image, and the output image generation unit inputs colorization area selection information corresponding to the face area, and generates a one point color image in which the face area is set as a colorization area in accordance with the input colorization area selection information.

(10) The image processing apparatus according to any one of (1) to (5), in which a colorization area in a one point color image is an area having a high exposure demodulation value detected during exposure control, and the output image generation unit inputs colorization area selection information corresponding to the exposure demodulation value, and generates a one point color image in which the area having the high exposure demodulation value is set as a colorization area in accordance with the input colorization area selection information.

(11) The image processing apparatus according to any one of (1) to (10), in which the image processing apparatus has an autofocus (AF) control unit that inputs information regarding a colorization area in a one point color image, and executes autofocus (AF) processing to focus on the colorization area.

(12) The image processing apparatus according to any one of (1) to (11), in which the image processing apparatus has an exposure (AE) control unit that inputs information regarding a colorization area in a one point color image, and executes exposure control for setting an exposure suitable for a subject in the colorization area.

(13) An image processing method executed by an image processing apparatus, the method including:

a composite image generation step in which a composite image generation unit generates a composite image by executing composition processing using a color image and a monochrome image captured from different viewpoints; and an output image generation step in which an output image generation unit generates a one point color image in which only a partial area of the image is colored, in which the output image generation step generates a one point color image in which a colorization area in the one point color image is set as an area to which pixel values of the composite image are output, and a non-colorization area in the one point color image is set as an area to which pixel values of the monochrome image are output.

(14) A program that causes an image processing apparatus to execute image processing including:

a composite image generation step that causes a composite image generation unit to generate a composite image by executing composition processing using a color image and a monochrome image captured from different viewpoints; and an output image generation step that causes an output image generation unit to generate a one point color image in which only a partial area of the image is colored, in which the output image generation step causes generation of a one point color image in which a colorization area in the one point color image is set as an area to which pixel values of the composite image are output, and a non-colorization area in the one point color image is set as an area to which pixel values of the monochrome image are output.

Furthermore, the series of processing described in the specification can be executed by hardware, software, or a combination of both. In a case of executing the processing by software, a program in which a processing sequence has been recorded can be installed on a memory in a computer built in dedicated hardware and then executed, or the program can be installed on a general-purpose computer capable of executing various types of processing and then executed. For example, the program can be recorded in a recording medium in advance. Besides installing the program from a recording medium to a computer, the program can be received via a network such as a local area network (LAN) or the Internet and installed on a recording medium such as a built-in hard disk.

Note that the various types of processing described in the specification may be executed not only in chronological order in accordance with the description, but also in parallel or individually in accordance with the processing capacity of the device that executes the processing or as necessary. Furthermore, in the present specification, a system is a logical assembly constituted by a plurality of devices, and the devices constituting the assembly are not necessarily contained in the same housing.

INDUSTRIAL APPLICABILITY

As described above, according to the configuration of the embodiment of the present disclosure, an apparatus and a method capable of generating a high-quality one point color image are provided.

Specifically, for example, a composite image generation unit that generates a composite image by executing composition processing using a color image and a monochrome image captured from different viewpoints, and an output image generation unit that generates a one point color image in which only a partial area of the image is colored are included. The output image generation unit generates a one point color image in which a colorization area in the one point color image is set as an area to which pixel values of the composite image are output, and a non-colorization area is set as an area to which pixel values of the monochrome image are output. The colorization area is selected by either user selection or automatic selection. For example, user-specified area information, subject distance information, and the like are used for the execution.

With this configuration, an apparatus and a method capable of generating a high-quality one point color image are provided.

REFERENCE SIGNS LIST

10 Image processing apparatus
11 Display unit
12 Operation unit
21 Color image-capturing unit
22 Monochrome image-capturing unit
100 Image processing apparatus
110 Image-capturing unit
111 Color image-capturing unit
112 Monochrome image-capturing unit
120 Image processing unit
121, 122 Preprocessing unit
123 Parallax detection unit
124 Feature amount calculation unit
125 Image quality determination unit
126 Composite image generation unit
127 Output image generation unit (selection/composition)
130 Output unit
131 Display unit (touch panel)
132 Storage unit
141 Sensor unit
142 Operation unit
150 Control unit
160 Communication unit
251 Mode selection UI
252 Execution mode display unit
281 Mode specification information
285 Colorization area specification information

The invention claimed is:
1. An image processing apparatus, comprising:
circuitry configured to:
generate a composite image by execution of a composition processing operation using a color image and a monochrome image captured from different viewpoints; and
generate a one point color image in which only a partial area of the one point color image is colored, wherein
a colorization area in the one point color image is set as an area to which pixel values of the composite image are output, and a non-colorization area in the one point color image is set as an area to which pixel values of the monochrome image are output.

2. The image processing apparatus according to claim 1, wherein the circuitry is further configured to:
determine whether a color image-based composite image or a monochrome image-based composite image has a higher image quality; and
generate one of the color image-based composite image or the monochrome image-based composite image, whichever is determined to have the higher image quality.

3. The image processing apparatus according to claim 1, wherein the circuitry is further configured to:
generate one of a color image-based composite image or a monochrome image-based composite image; and
generate the one point color image in which the colorization area in the one point color image is set as an area to which pixel values of one of the generated color image-based composite image or the generated monochrome image-based composite image are output.

4. The image processing apparatus according to claim 1, wherein the circuitry is further configured to:
input colorization area selection information for the one point color image; and
generate the one point color image in which an area determined based on the input colorization area selection information is set as the colorization area.

5. The image processing apparatus according to claim 1, wherein
the colorization area in the one point color image is selected in one of a manual mode for user selection or an auto mode for automatic selection.

6. The image processing apparatus according to claim 1, wherein the circuitry is further configured to:
input colorization area selection information set by a user; and
generate the one point color image in which an area selected by the user is set as the colorization area based on the input colorization area selection information.

7. The image processing apparatus according to claim 1, wherein
the colorization area in the one point color image is automatically determined based on distances to subjects included in a captured image, and
the circuitry is further configured to:
input colorization area selection information based on the distances to the subjects; and
generate the one point color image in which an area of a subject at a specific distance is set as the colorization area based on the input colorization area selection information.

8. The image processing apparatus according to claim 1, wherein
the colorization area in the one point color image is automatically determined based on objects included in a captured image, and
the circuitry is further configured to:
input colorization area selection information based on the objects; and
generate the one point color image in which an area of a specific object is set as the colorization area based on the input colorization area selection information.

9. The image processing apparatus according to claim 1, wherein
the colorization area in the one point color image is a face area detected by facial recognition processing from a captured image, and
the circuitry is further configured to:
input colorization area selection information corresponding to the face area; and
generate the one point color image in which the face area is set as the colorization area based on the input colorization area selection information.

10. The image processing apparatus according to claim 1, wherein
the colorization area in the one point color image is an area having a high exposure demodulation value detected during exposure control, and
the circuitry is further configured to:
input colorization area selection information corresponding to the exposure demodulation value; and
generate the one point color image in which the area having the high exposure demodulation value is set as the colorization area based on the input colorization area selection information.

11. The image processing apparatus according to claim 1, wherein the circuitry is further configured to:
input information regarding the colorization area in the one point color image; and
execute autofocus (AF) processing to focus on the colorization area.

12. The image processing apparatus according to claim 1, wherein the circuitry is further configured to:
input information regarding the colorization area in the one point color image; and
execute exposure control for setting an exposure suitable for a subject in the colorization area.

13. An image processing method executed by an image processing apparatus, the method comprising:
generating a composite image by executing composition processing using a color image and a monochrome image captured from different viewpoints; and
generating a one point color image in which only a partial area of the one point color image is colored, wherein
a colorization area in the one point color image is set as an area to which pixel values of the composite image are output, and
a non-colorization area in the one point color image is set as an area to which pixel values of the monochrome image are output.

14. A non-transitory computer-readable medium having stored thereon, computer-executable instructions that when executed by an electronic device, causes the electronic device to execute operations, the operations comprising:
generating a composite image by executing composition processing using a color image and a monochrome image captured from different viewpoints; and
generating a one point color image in which only a partial area of the one point color image is colored, wherein
a colorization area in the one point color image is set as an area to which pixel values of the composite image are output, and
a non-colorization area in the one point color image is set as an area to which pixel values of the monochrome image are output.

* * * * *